(12) United States Patent
Jeong

(10) Patent No.: US 10,166,959 B2
(45) Date of Patent: Jan. 1, 2019

(54) METHOD FOR DIAGNOSING ELECTRIC BRAKE SYSTEM

(71) Applicant: MANDO CORPORATION, Pyeongtaek-si, Gyeonggi-do (KR)

(72) Inventor: Hyo-Jin Jeong, Seongnam-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 57 days.

(21) Appl. No.: 15/298,000

(22) Filed: Oct. 19, 2016

(65) Prior Publication Data
US 2017/0106843 A1 Apr. 20, 2017

(30) Foreign Application Priority Data

Oct. 19, 2015 (KR) .................. 10-2015-0145175

(51) Int. Cl.
*B60T 8/88* (2006.01)
*B60T 7/04* (2006.01)
*B60T 8/40* (2006.01)
*B60T 8/90* (2006.01)
*B60T 11/232* (2006.01)
*B60T 11/236* (2006.01)
*B60T 13/14* (2006.01)
(Continued)

(52) U.S. Cl.
CPC ............ *B60T 8/88* (2013.01); *B60T 7/042* (2013.01); *B60T 8/4081* (2013.01); *B60T 8/90* (2013.01); *B60T 11/232* (2013.01); *B60T 11/236* (2013.01); *B60T 13/146* (2013.01); *B60T 13/662* (2013.01); *B60T 13/686* (2013.01); *B60T 13/745* (2013.01); *B60T 2270/406* (2013.01); *B60T 2270/82* (2013.01)

(58) Field of Classification Search
CPC ..... B60T 2270/406; B60T 8/88; B60T 13/686
See application file for complete search history.

(56) References Cited

U.S. PATENT DOCUMENTS

| | | | | |
|---|---|---|---|---|
| 6,450,591 | B1* | 9/2002 | Kawahata | B60T 8/3655 303/122.05 |
| 2014/0368027 | A1* | 12/2014 | Bohm | B60T 8/4081 303/14 |

FOREIGN PATENT DOCUMENTS

| | | |
|---|---|---|
| DE | 102012201535 A1 | 10/2012 |
| EP | 2520473 A1 | 11/2012 |

* cited by examiner

*Primary Examiner* — Nicholas J Lane
(74) *Attorney, Agent, or Firm* — McDermott Will & Emery LLP

(57) ABSTRACT

A method for diagnosing an electric brake system is disclosed. The method for diagnosing an electric brake system, which includes a reservoir, a master cylinder, a first backup flow path, a second backup flow path, a first cut valve, a second cut, a simulation device, a hydraulic pressure supply device, a first hydraulic flow path, a second hydraulic flow path, a hydraulic control unit, and an electronic control unit configured to control the hydraulic pressure supply device and the valves on the basis of hydraulic pressure information and displacement information of the brake pedal, comprising a first diagnosis mode of: closing the first cut valve and the second cut valve when the pedal effort is not provided to the brake pedal; operating the hydraulic pressure supply device to generate hydraulic pressure at the hydraulic control unit; measuring the hydraulic pressure in the first or second hydraulic circuit; and comparing the measured hydraulic pressure with a first reference pressure to diagnose abnormality of the valves.

15 Claims, 12 Drawing Sheets

(51) Int. Cl.
*B60T 13/66* (2006.01)
*B60T 13/68* (2006.01)
*B60T 13/74* (2006.01)

[Fig. 1]
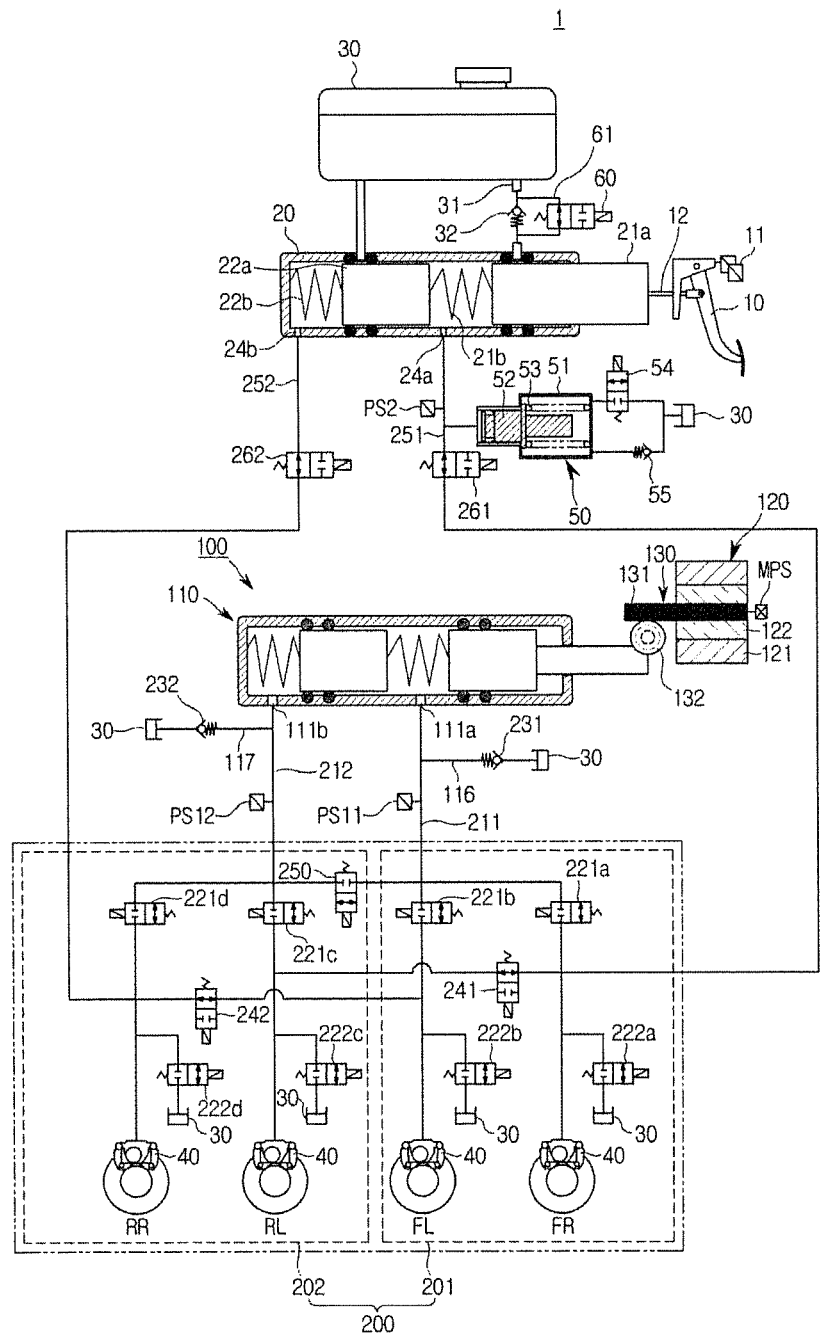

[Fig. 2]
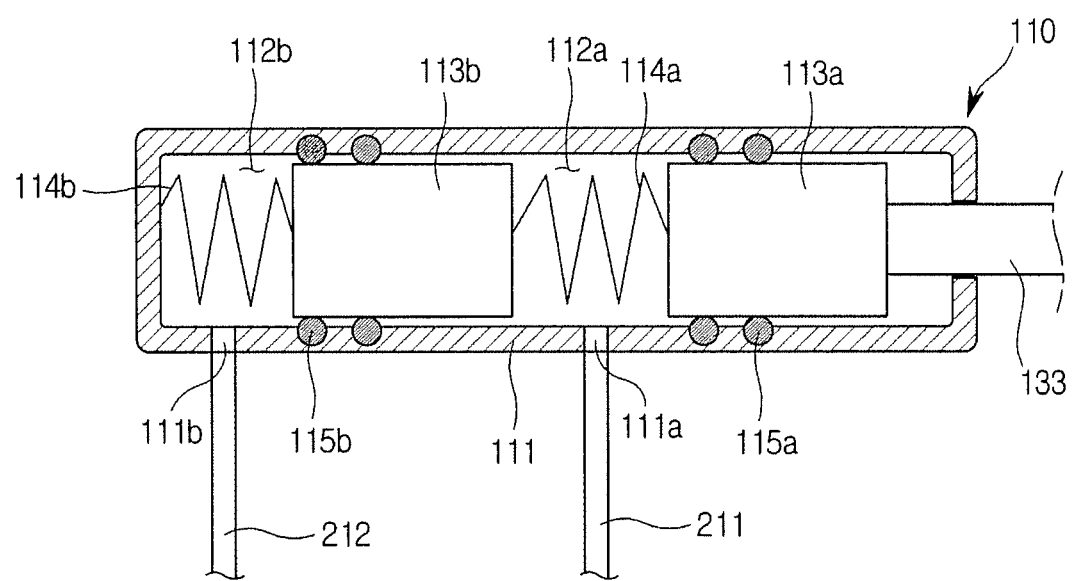

[Fig. 3]
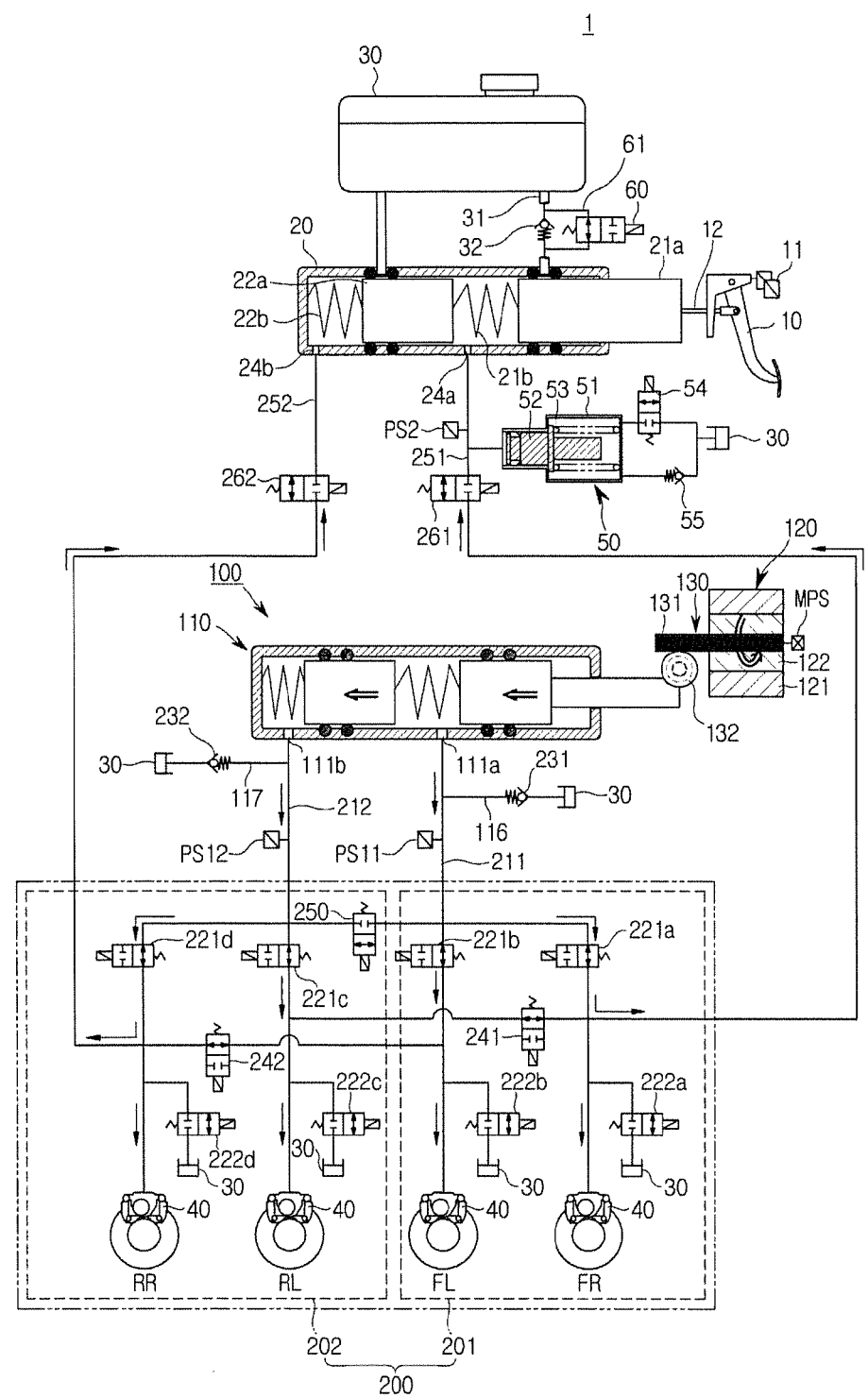

[Fig. 4]
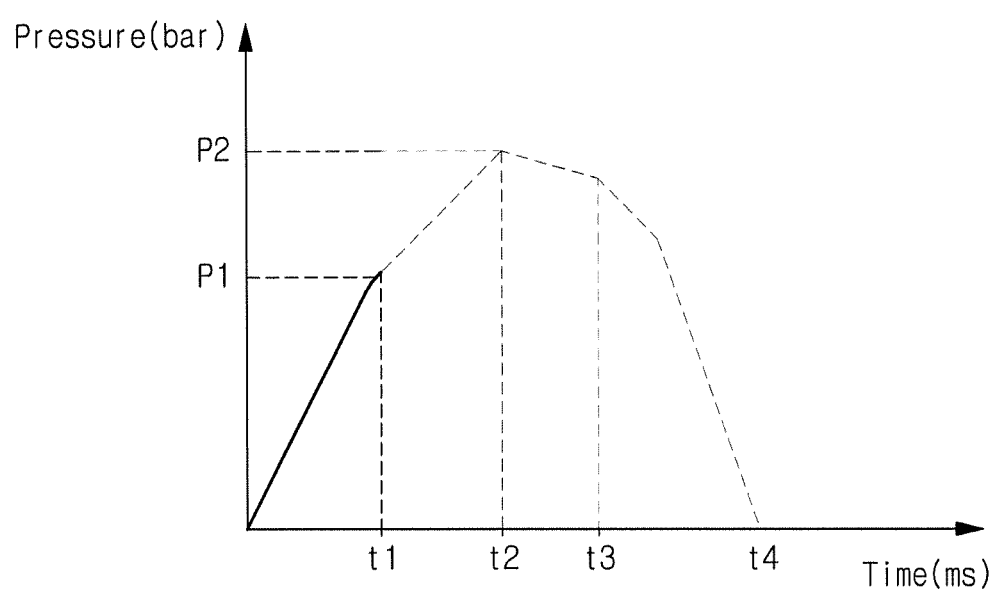

【Fig. 5】
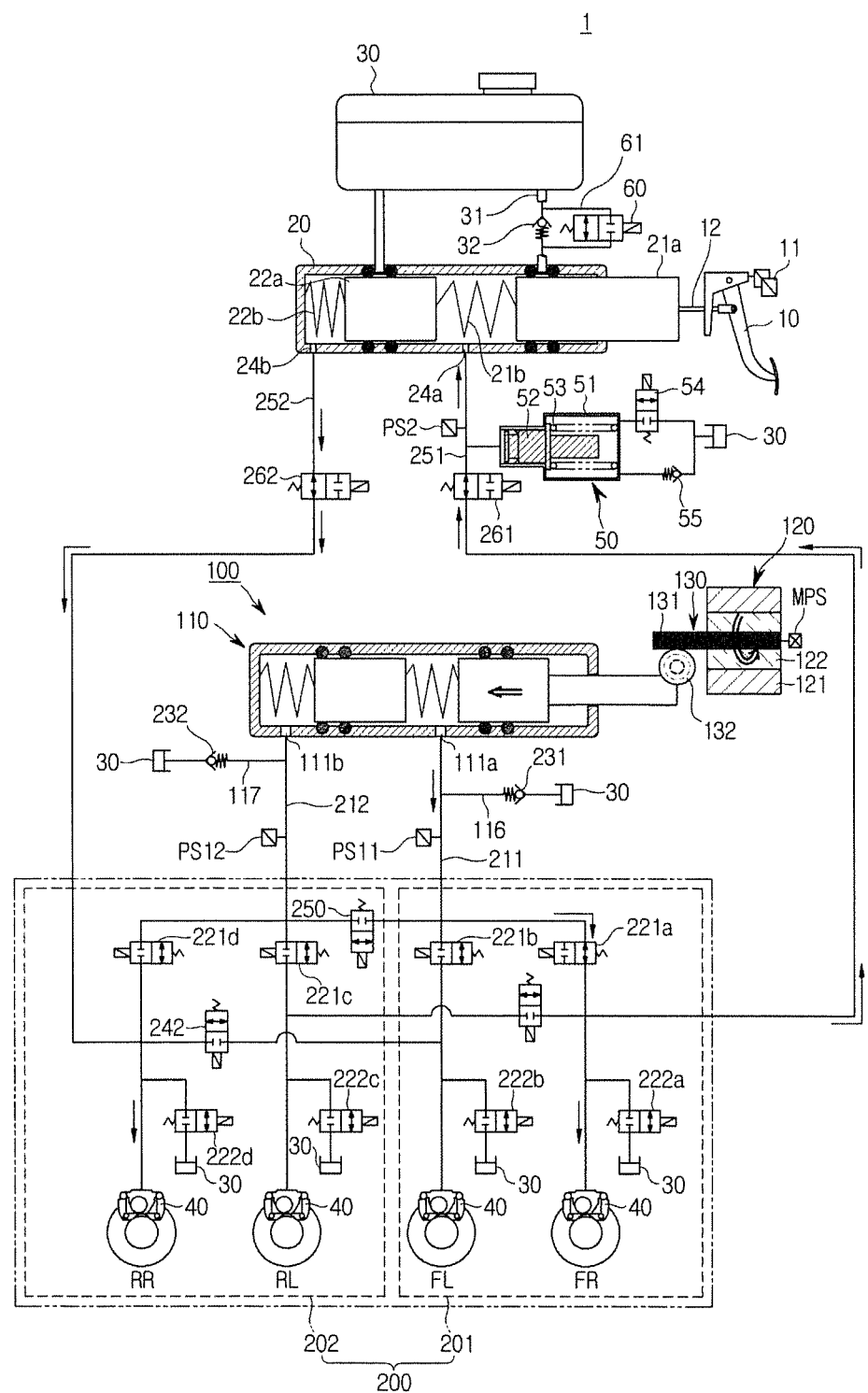

[Fig. 6]
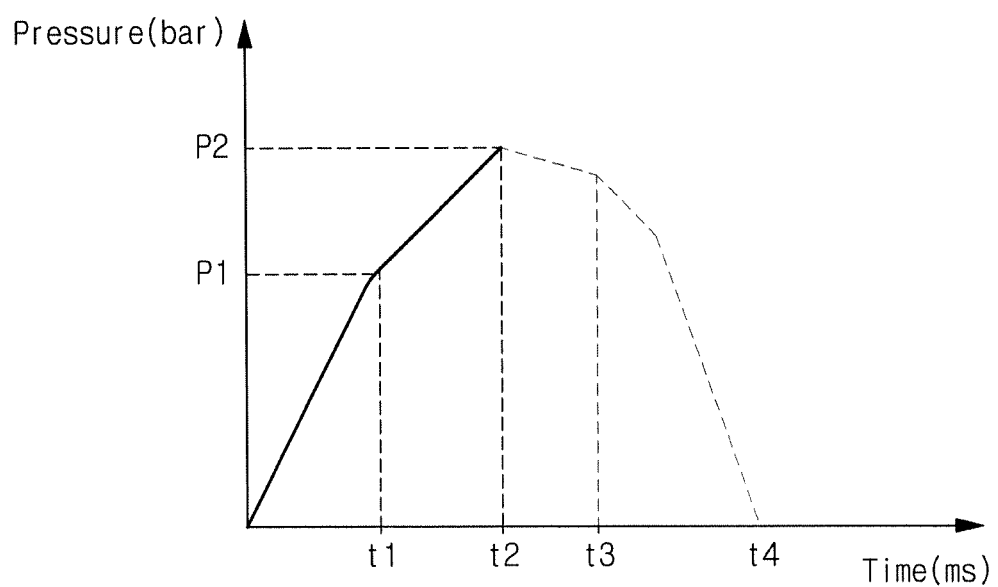

[Fig. 7]
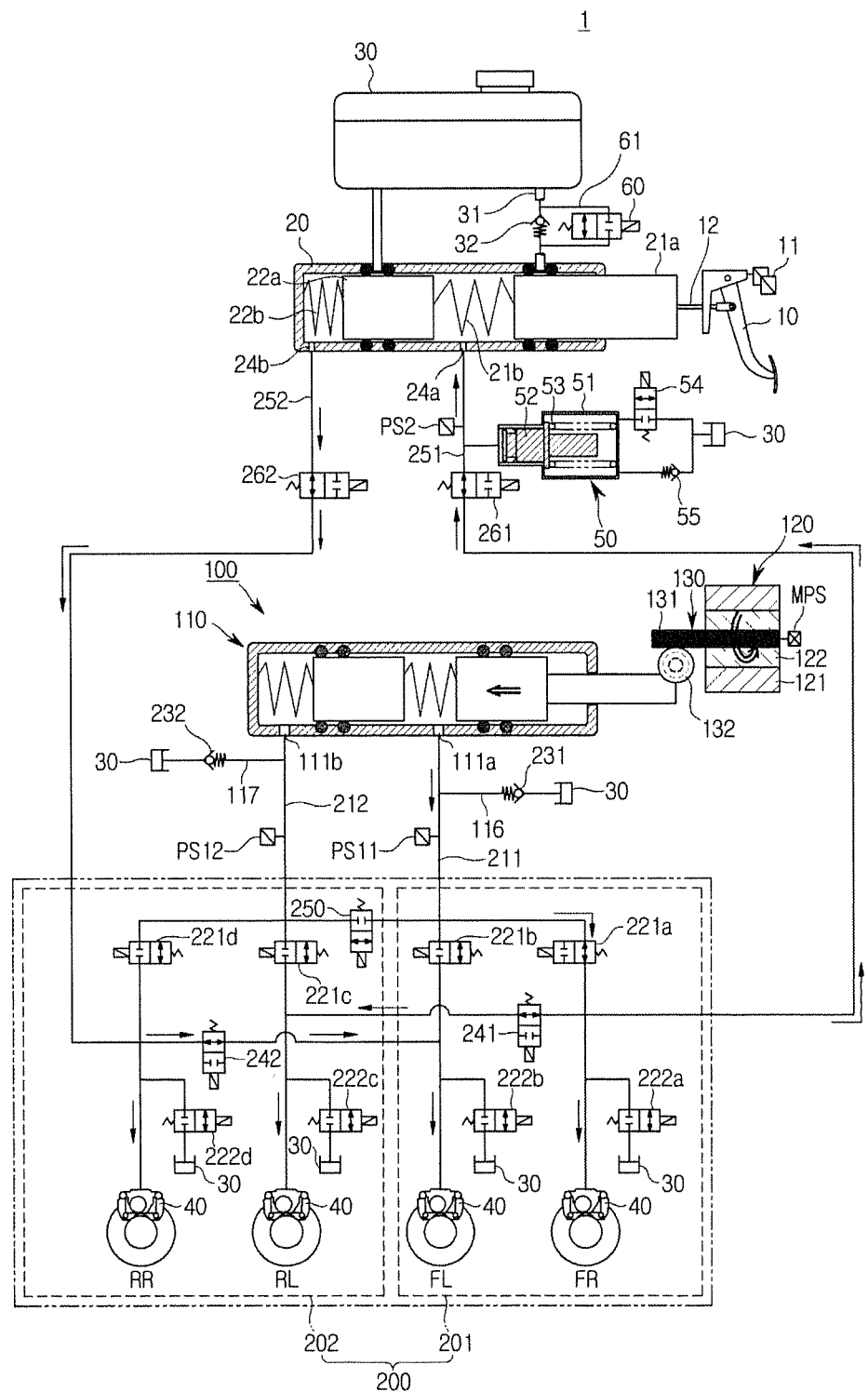

[Fig. 8]
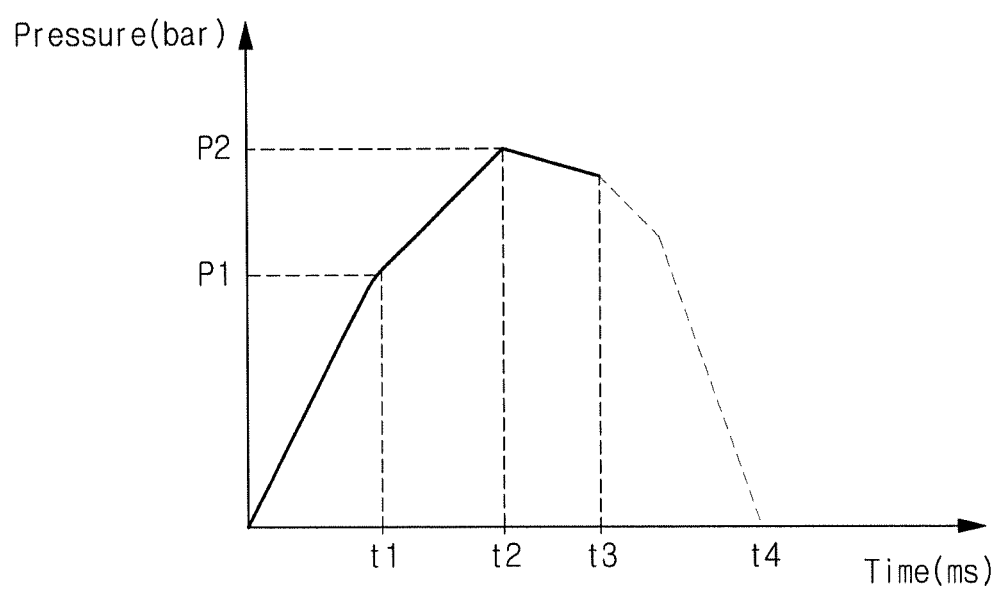

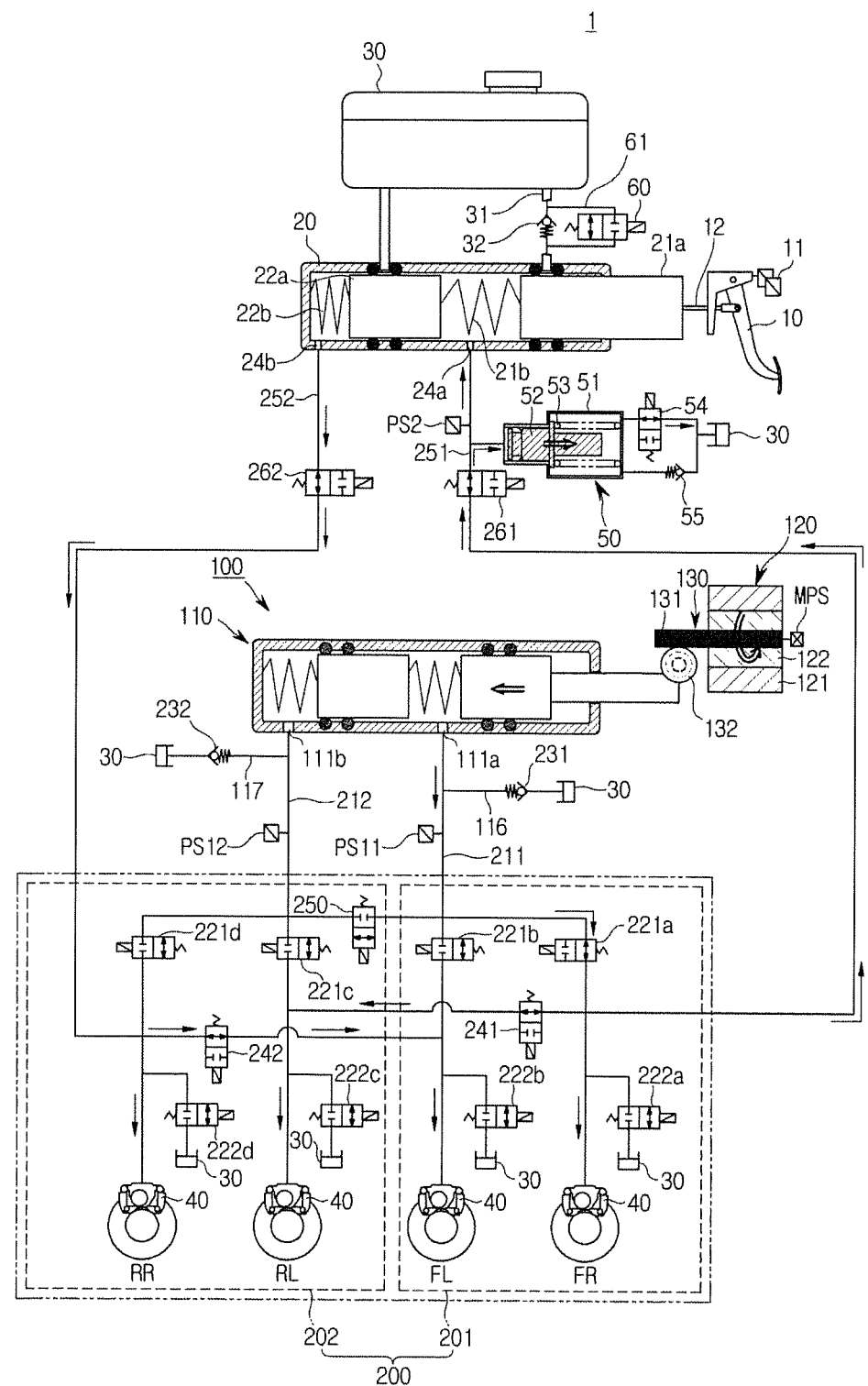
[Fig. 9]

[Fig. 10]
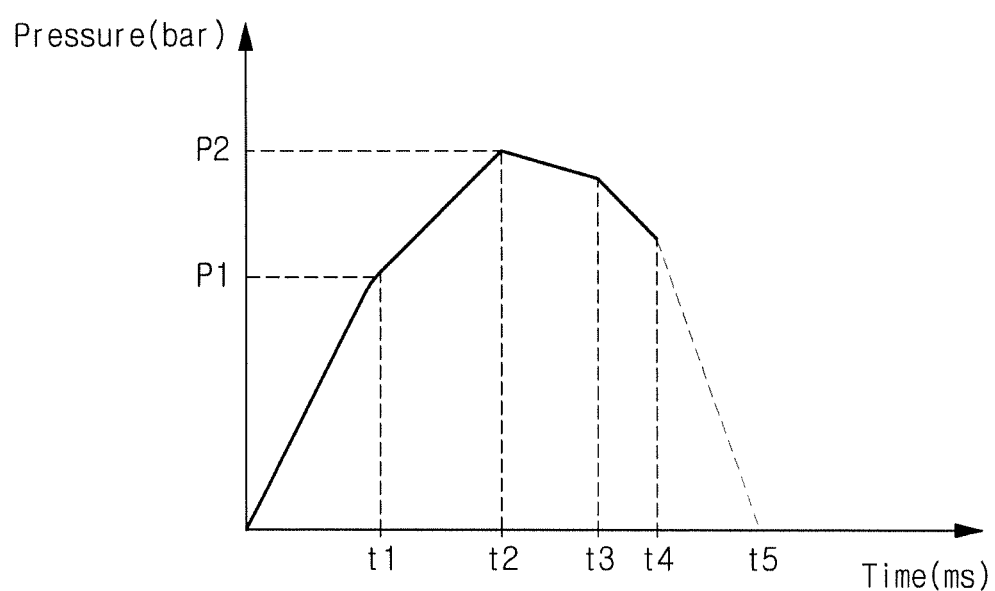

[Fig. 11]
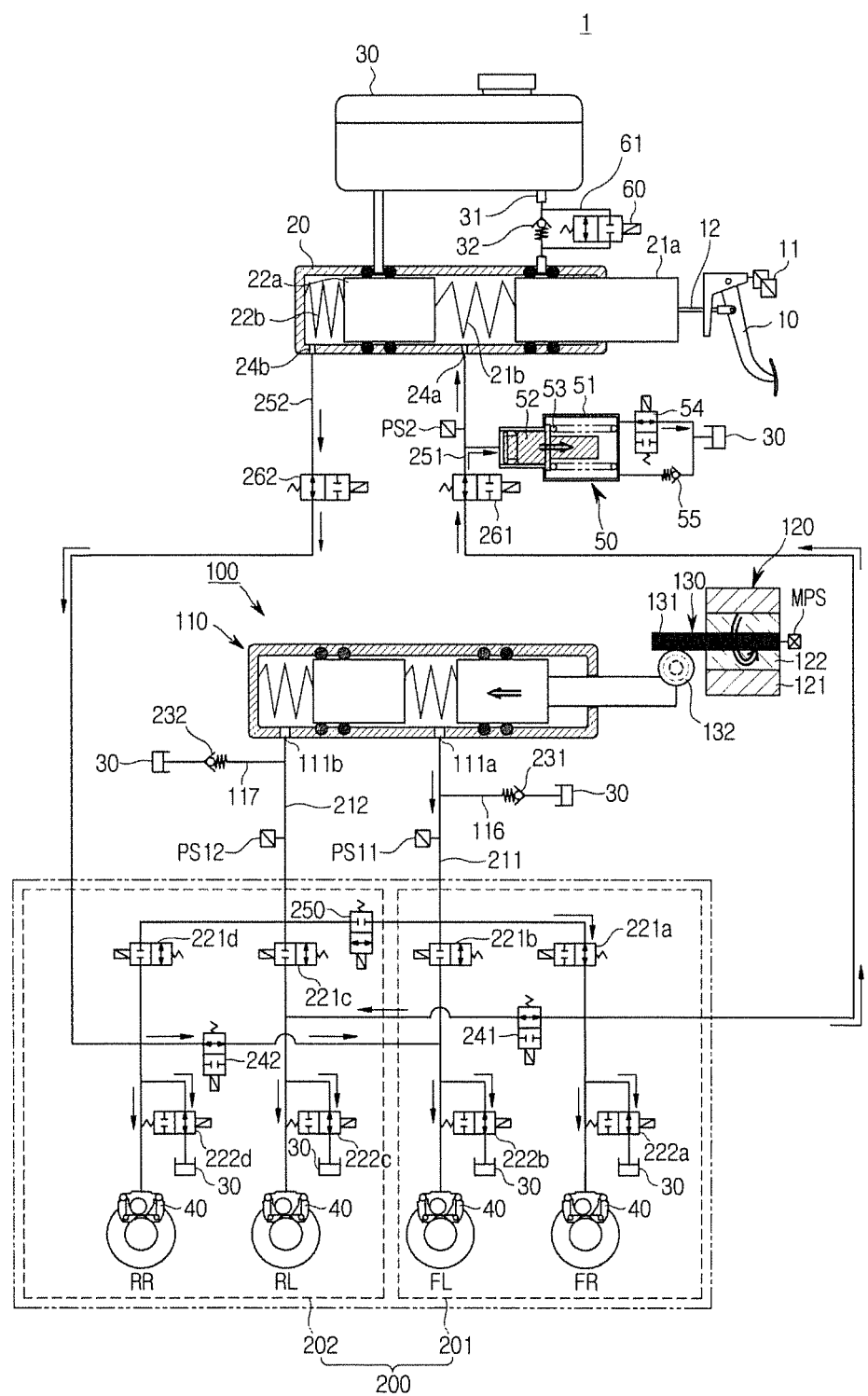

[Fig. 12]
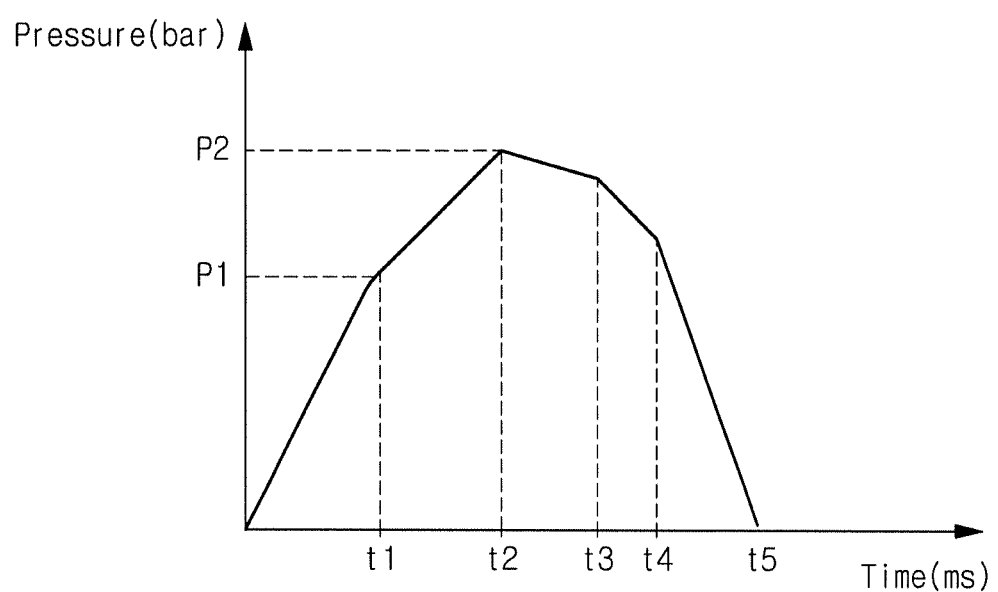

METHOD FOR DIAGNOSING ELECTRIC BRAKE SYSTEM

This application claims the benefit of Korean Patent Application No. 2015-0145175, filed on Oct. 19, 2015 in the Korean Intellectual Property Office, the disclosure of which is incorporated herein by reference.

BACKGROUND

1. Field

Embodiments of the present disclosure relate to a method for diagnosing an electric brake system, and more particularly, to a method for diagnosing an electric brake system generating a braking force using an electrical signal corresponding to a displacement of a brake pedal.

2. Description of the Related Art

A brake system for braking is necessarily mounted on a vehicle, and a variety of systems for providing stronger and more stable braking have been proposed recently.

For example, there are brake systems including an antilock brake system (ABS) for preventing a wheel from sliding while braking, a brake traction control system (BTCS) for preventing a driving wheel from slipping when a vehicle is unintentionally or intentionally accelerated, an electronic stability control system (ESC) for stably maintaining a driving state of a vehicle by combining an ABS with traction control to control hydraulic pressure of a brake, and the like.

Generally, an electric brake system includes a hydraulic pressure supply device which receives a braking intent of a driver in the form of an electrical signal from a pedal displacement sensor which senses a displacement of a brake pedal when the driver steps on the brake pedal and then supplies hydraulic pressure to a wheel cylinder.

An electric brake system provided with such a hydraulic pressure supply device is disclosed in European Registered Patent No. EP 2 520 473. According to the disclosure in that document, the hydraulic pressure supply device is configured such that a motor is activated according to a pedal effort of a brake pedal to generate braking pressure. At this point, the braking pressure is generated by converting a rotational force of the motor into a rectilinear movement to pressurize a piston.

PRIOR ART DOCUMENT (Patent Document) EP 2 520 473 A1 (Honda Motor Co., Ltd.), Nov. 7, 2012.

SUMMARY

Therefore, it is an aspect of the present disclosure to provide an electric brake system detecting abnormality of mechanical components through a diagnosis mode and informing a driver of the detection result, and a method for diagnosing the same.

Additional aspects of the disclosure will be set forth in part in the description which follows and, in part, will be obvious from the description, or may be learned by practice of the disclosure.

In accordance with one aspect of the present invention, there is provided a method for diagnosing an electric brake system, which includes a reservoir configured to store oil, a master cylinder at which first and second hydraulic ports are formed, connected to the reservoir, and having one or more pistons to discharge oil according to a pedal effort of a brake pedal, a first backup flow path configured to connect the first hydraulic port to a wheel cylinder, a second backup flow path configured to connect to the second hydraulic port to a wheel cylinder, a first cut valve provided at the first backup flow path and configured to control an oil flow, a second cut valve provided at the second backup flow path and configured to control an oil flow, a simulation device provided at a flow path branching from the first backup flow path, provided with a simulator valve provided at a flow path connecting a simulation chamber in which oil is accommodated to the reservoir, and configured to provide a reaction force according to the pedal effort of the brake pedal, a hydraulic pressure supply device configured to operate in response to an electrical signal output from a pedal displacement sensor sensing a displacement of the brake pedal and generate hydraulic pressure by means of an operation of a hydraulic piston, a first hydraulic flow path connected to the hydraulic pressure supply device and to the first backup flow path, a second hydraulic flow path connected to the hydraulic pressure supply device and to the second backup flow path, a hydraulic control unit connected to the first and second hydraulic flow paths, configured to deliver the hydraulic pressure discharged from the hydraulic pressure supply device to a wheel cylinder provided at each of wheels, and including first and second hydraulic circuits connected to different wheel cylinders, and an electronic control unit configured to control the hydraulic pressure supply device and the valves on the basis of hydraulic pressure information and displacement information of the brake pedal, comprising a first diagnosis mode of: closing the first cut valve and the second cut valve when the pedal effort is not provided to the brake pedal; operating the hydraulic pressure supply device to generate hydraulic pressure at the hydraulic control unit; measuring the hydraulic pressure in the first or second hydraulic circuit; and comparing the measured hydraulic pressure with a first reference pressure to diagnose abnormality of the valves.

Also, the hydraulic control unit of the electric brake system further includes: a first inlet valve, a second inlet valve, a third inlet valve, and a fourth inlet valves provided at an upstream side of the wheel cylinder to control hydraulic pressure flowing to the wheel cylinder installed at each of the wheels; and first to fourth outlet valves configured to control flow opening and blocking of a flow path branching from a flow path between the first to fourth inlet valves and the wheel cylinder to be connected to the reservoir, wherein the method further includes a second diagnosis mode of: opening the first cut valve and the second cut valve when the pedal effort is not provided to the brake pedal; opening some of the first to fourth inlet valves; closing the first to fourth outlet valves; operating the hydraulic pressure supply device to generate hydraulic pressure at the hydraulic control unit; measuring hydraulic pressure at one or more of the first and second hydraulic circuits and the first and second backup flow paths; and comparing the measured hydraulic pressure with a second reference pressure to diagnose abnormality of the valves.

Also, the electric brake system further includes an inspection valve provided at a flow path connecting the reservoir to the master cylinder, and the second diagnosis mode generates hydraulic pressure at the hydraulic control unit when the inspection valve is closed.

Also, the hydraulic pressure supply device of the electric brake system includes a cylinder block, first and second hydraulic pistons movably accommodated inside the cylinder block, and first and second pressure chambers comparted by the first and second hydraulic pistons, the hydraulic control unit includes: a first hydraulic circuit configured to communicate with the first pressure chamber and connected to a first wheel cylinder through the first inlet valve; a second hydraulic circuit configured to communicate with the first pressure chamber and connected to a second wheel cylinder through the second inlet valve; a third hydraulic circuit configured to communicate with the second pressure chamber and connected to a third wheel cylinder through the third inlet valve; and a fourth hydraulic circuit configured to communicate with the second pressure chamber and connected to a fourth wheel cylinder through the fourth inlet valve, and the second diagnosis mode generates hydraulic pressure at the hydraulic control unit when only the first inlet valve is opened and the second to fourth inlet valves are closed.

Also, the hydraulic control unit of the electric brake system further includes: a first balance valve installed at a downstream side of each of the first inlet valve and the third inlet valve and configured to open and block a flow path provided to communicate the first hydraulic circuit to the third hydraulic circuit; and a second balance valve installed at a downstream side of each of the second inlet valve and the fourth inlet valve and configured to open and block a flow path provided to communicate the second hydraulic circuit to the fourth hydraulic circuit, and the second diagnosis mode generates hydraulic pressure at the hydraulic control unit when the first and second balance valves are closed.

Also, the hydraulic control unit of the electric brake system further comprising a third diagnosis mode of: opening the first cut valve and the second cut valve when the pedal effort is not provided to the brake pedal; opening some of the first to fourth inlet valves; closing the first to fourth outlet valves; opening the first and second balance valves; operating the hydraulic pressure supply device to generate hydraulic pressure at the hydraulic control unit; measuring hydraulic pressure at one or more among the first and second hydraulic circuits and the first and second backup flow paths; and comparing the measured hydraulic pressure with a third reference pressure to diagnose abnormality of the valves.

Also, the second diagnosis mode and the third diagnosis mode are compared with each other to diagnose abnormality of the first or second balance valve.

Also, the hydraulic control unit of the electric brake system further comprising a fourth diagnosis mode of: opening the first cut valve and the second cut valve when the pedal effort is not provided to the brake pedal; opening some of the first to fourth inlet valves; closing the first to fourth outlet valves; opening the simulator valve; operating the hydraulic pressure supply device to generate hydraulic pressure at the hydraulic control unit; measuring hydraulic pressure at one or more among the first and second hydraulic circuits and the first and second backup flow paths; and comparing the measured hydraulic pressure with a fourth reference pressure to diagnose abnormality of the valves.

Also, the hydraulic control unit of the electric brake system further comprising a fourth diagnosis mode of: opening the simulator valve to measure the hydraulic pressure again after the third diagnosis mode is executed; and comparing the measured hydraulic pressure with a fourth reference pressure to diagnose abnormality of the valves.

Also, the third diagnosis mode and the fourth diagnosis mode are compared with each other to diagnose abnormality of the simulator valve.

Also, the hydraulic control unit of the electric brake system further comprising a fifth diagnosis mode of: opening the first cut valve and the second cut valve when the pedal effort is not provided to the brake pedal; opening some of the first to fourth inlet valves; opening the first to fourth outlet valves; opening the first and second balance valves; operating the hydraulic pressure supply device to generate hydraulic pressure at the hydraulic control unit; measuring hydraulic pressure at one or more among the first and second hydraulic circuits and the first and second backup flow paths; and comparing the measured hydraulic pressure with a fifth reference pressure to diagnose abnormality of the valves.

Also, the hydraulic control unit of the electric brake system further comprising a fifth diagnosis mode of: opening the first to fourth outlet valves to measure the hydraulic pressure again after the third diagnosis mode is executed; and comparing the measured hydraulic pressure with a fifth reference pressure to diagnose abnormality of the valves.

Also, the fourth diagnosis mode and the fifth diagnosis mode are compared with each other to diagnose abnormality of the first to fourth outlet valves.

Also, the execution of the first diagnosis mode is completed while a vehicle is in a stop state and the pedal effort is not provided to the brake pedal.

Also, the first diagnosis mode is executed when a gear of the vehicle is in a parking mode.

BRIEF DESCRIPTION OF THE DRAWINGS

FIG. 1 is a hydraulic circuit diagram illustrating a non-braking state of an electric brake system according to an embodiment of the present disclosure.

FIG. 2 is a diagram illustrating a structure of the hydraulic pressure supply device.

FIG. 3 is a hydraulic circuit diagram illustrating a state in which a first diagnosis state is operated.

FIG. 4 is a graph illustrating a pressure distribution in the first diagnosis state.

FIG. 5 is a hydraulic circuit diagram illustrating a state in which a second diagnosis state is operated.

FIG. 6 is a graph illustrating a pressure distribution in the second diagnosis state.

FIG. 7 is a hydraulic circuit diagram illustrating a state in which a third diagnosis state is operated.

FIG. 8 is a graph illustrating a pressure distribution in the third diagnosis state.

FIG. 9 is a hydraulic circuit diagram illustrating a state in which a fourth diagnosis state is operated.

FIG. 10 is a graph illustrating a pressure distribution in the fourth diagnosis state.

FIG. 11 is a hydraulic circuit diagram illustrating a state in which a fifth diagnosis state is operated.

FIG. 12 is a graph illustrating a pressure distribution in the fifth diagnosis state.

DETAILED DESCRIPTION

Hereinafter, embodiments of the present disclosure will be described in detail with reference to the accompanying drawings. The embodiments to be described below are provided to fully convey the spirit of the present disclosure to a person skilled in the art. The present disclosure is not limited to the embodiments disclosed herein and may be implemented in other forms. In the drawings, some portions not related to the description will be omitted and will not be shown in order to clearly describe the present disclosure, and also a size of a component may be somewhat exaggerated to help understanding.

FIG. 1 is a hydraulic circuit diagram illustrating a non-braking state of an electric brake system 1 according to an embodiment of the present disclosure.

Referring to FIG. 1, the electric brake system 1 generally includes a master cylinder 20 for generating hydraulic pressure, a reservoir 30 coupled to an upper part of the master cylinder 20 to store oil, an input rod 12 for pressurizing the master cylinder 20 according to a pedal effort of a brake pedal 10, a wheel cylinder 40 for receiving the hydraulic pressure to perform braking of each of wheels RR, RL, FR, and FL, a pedal displacement sensor 11 for sensing a displacement of the brake pedal 10, and a simulation device 50 for providing a reaction force according to the pedal effort of the brake pedal 10.

The master cylinder 20 may be configured to include at least one chamber to generate hydraulic pressure. As one example, the master cylinder 20 may be configured to include two chambers, a first piston 21a and a second piston 22a may be provided at the two chambers, respectively, and the first piston 21a and the input rod 12 may be connected to each other.

Meanwhile, the master cylinder 20 may include two chambers to secure safety when one chamber fails. For example, one of the two chambers may be connected to a front right wheel FR and a rear left wheel RL of a vehicle and the remaining chamber may be connected to a front left wheel FL and a rear right wheel RR. Otherwise, one of the two chambers may be connected to two front wheels FR and FL and the remaining chamber may be connected to two rear wheels RR and RL. As described above, the two chambers may be independently configured so that braking of a vehicle may be possible even when one of the two chambers fails.

For this purpose, the master cylinder 20 may include first and second hydraulic ports 24a and 24b which are formed thereon and through which hydraulic pressure is discharged from each of the two chambers.

Also, a first spring 21b may be provided between the first piston 21a and the second piston 22a of the master cylinder 20, and a second spring 22b may be provided between the second piston 22a and an end of the master cylinder 20.

The first spring 21b and the second spring 22b are provided at the two chambers, respectively, to store an elastic force when the first piston 21a and the second piston 22a are compressed according to a variance of displacement of the brake pedal 10. Further, when a force pushing the first piston 21a is less than the elastic force, the first spring 21b and the second spring 22b may use the stored elastic force to push the first and second pistons 21a and 22a and return the first and second pistons 21a and 22a to their original positions, respectively.

Meanwhile, the input rod 12 pressurizing the first piston 21a of the master cylinder 20 may come into close contact with the first piston 21a. In other words, no gap may exist between the master cylinder 20 and the input rod 12. Consequently, when the brake pedal 10 is stepped on, the master cylinder 20 may be directly pressurized without a pedal dead stroke section.

The simulation device 50 may be connected to a first backup flow path 251, which will be described below, to provide a reaction force according to the pedal effort of the brake pedal 10. A reaction force may be provided to compensate for a pedal effort provided from a driver such that a braking force may be finely controlled as intended by the driver.

Referring to FIG. 1, the simulation device 50 includes a simulation chamber 51 provided to store oil discharged from the first hydraulic port 24a of the master cylinder 20, a reaction force piston 52 provided inside the simulation chamber 51, a pedal simulator provided with a reaction force spring 53 elastically supporting the reaction force piston 52, and a simulator valve 54 connected to a rear end part of the simulation chamber 51.

The reaction force piston 52 and the reaction force spring 53 are respectively installed to have a predetermined range of displacement within the simulation chamber 51 by means of oil flowing therein.

Meanwhile, the reaction force spring 53 shown in the drawing is merely one embodiment capable of providing an elastic force to the reaction force piston 52, and thus it may include numerous embodiments capable of storing an elastic force through shape deformation. As one example, the reaction force spring 53 includes a variety of members which are configured with a material including rubber and the like and have a coil or plate shape, thereby being able to store an elastic force.

The simulator valve 54 may be provided at a flow path connecting a rear end of the simulation chamber 51 to the reservoir 30. A front end of the simulation chamber 51 may be connected to the master cylinder 20, and the rear end of the simulation chamber 51 may be connected to the reservoir 30 through the simulator valve 54. Therefore, when the reaction force piston 52 returns, oil inside the reservoir 30 may flow through the simulator valve 54 so that an inside of the simulation chamber 51 is entirely filled with the oil.

Meanwhile, a plurality of reservoirs 30 are shown in the drawing, and the same reference number is assigned to each of the plurality of reservoirs 30. The reservoirs may be configured with the same components and may alternatively be configured with different components. As one example, the reservoir 30 connected to the simulation device 50 may be the same as the reservoir 30 connected to the master cylinder 20 or may be a storage part capable of storing oil separately from the reservoir 30 connected to the master cylinder 20.

Meanwhile, the simulator valve 54 may be configured with a normally closed type solenoid valve usually maintaining a closed state. When the driver applies a pedal effort to the brake pedal 10, the simulator valve 54 may be opened to deliver brake oil between the simulation chamber 51 and the reservoir 30.

Also, a simulator check valve 55 may be installed to be connected in parallel with the simulator valve 54 between the pedal simulator and the reservoir 30. The simulator check valve 55 may allow the oil inside the reservoir 30 to flow toward the simulation chamber 51 and may block the oil inside the simulation chamber 51 from flowing toward the reservoir 30 through a flow path at which the simulator check valve 55 is installed. When the pedal effort of the brake pedal 10 is released, the oil may be provided inside the simulation chamber 51 through the simulator check valve 55 to ensure a rapid return of pressure of the pedal simulator.

To describe an operating process of the simulation device 50, when the driver applies a pedal effort to the brake pedal 10, the oil inside the simulation chamber 51, which is pushed by the reaction force piston 52 of the pedal simulator while the reaction force piston 52 compresses the reaction force spring 53, is delivered to the reservoir 30 through the simulator valve 54, and then a pedal feeling is provided to the driver through such an operation. Further, when the driver releases the pedal effort from the brake pedal 10, the reaction force spring 53 may push the reaction force piston 52 to return the reaction force piston 52 to its original state, and the oil inside the reservoir 30 may flow into the simulation chamber 51 through the flow path at which the simulator valve 54 is installed and the flow path at which the simulator check valve 55 is installed, thereby completely filling the inside of the simulation chamber 51 with the oil.

As described above, because the inside of the simulation chamber 51 is in a state in which the oil is filled therein at all times, friction of the reaction force piston 52 is minimized when the simulation device 50 is operated, and thus durability of the simulation device 50 may be improved and also introduction of foreign materials from the outside may be blocked.

The electric brake system 1 according to the embodiment of the present disclosure may include a hydraulic pressure supply device 100 which is mechanically operated by receiving a braking intent of the driver in the form of an electrical signal from the pedal displacement sensor 11 measuring a displacement of the brake pedal 10, a hydraulic control unit 200 configured with first and second hydraulic circuits 201 and 202, each of which is provided at two wheels respectively, and controlling a hydraulic pressure flow delivered to the wheel cylinder 40 that is provided at each of the wheels RR, RL, FR, and FL, a first cut valve 261 provided at the first backup flow path 251 connecting the first hydraulic port 24a to the first hydraulic circuit 201 to control a hydraulic pressure flow, a second cut valve 262 provided at a second backup flow path 252 connecting the second hydraulic port 24b to the second hydraulic circuit 202 to control a hydraulic pressure flow, and an electronic control unit (ECU) (not shown) controlling the hydraulic pressure supply device 100 and valves 54, 60, 221a, 221b, 221c, 221d, 222a, 222b, 222c, 222d, 241, 242, 250, 261, and 262 on the basis of hydraulic pressure information and pedal displacement information.

FIG. 2 is a diagram illustrating a structure of the hydraulic pressure supply device 100.

Referring to FIG. 2, the hydraulic pressure supply device 100 may include a hydraulic pressure supply unit 110 providing oil pressure delivered to the wheel cylinder 40, a motor 120 generating a rotational force in response to an electrical signal of the pedal displacement sensor 11, and a power conversion unit 130 converting a rotational movement of the motor 120 into a rectilinear movement and transmitting the rectilinear movement to the hydraulic pressure supply unit 110. Also, the hydraulic pressure supply unit 110 may be operated by means of pressure provided from a high pressure accumulator instead of a driving force supplied from the motor 120.

The hydraulic pressure supply unit 110 includes a cylinder block 111 in which a pressure chamber 112 (that is, 112a and 112b) for receiving and storing oil therein is formed, a hydraulic piston 113 (that is, 113a and 113b) accommodated in the cylinder block 111, and a sealing member 115 (that is, 115a and 115b) provided between the hydraulic piston 113 and the cylinder block 111 to seal the pressure chamber 112.

The hydraulic pressure supply unit 110 may be configured to include two or more pressure chambers to generate hydraulic pressure. As one example, the hydraulic pressure supply unit 110 may be configured to include two pressure chambers 112a and 112b, a first hydraulic piston 113a may be provided at a first pressure chamber 112a, and a second hydraulic piston 113b may be provided at a second pressure chamber 112b, and the first hydraulic piston 113a may be connected to a drive shaft 133 of the power conversion unit 130 which will be described below. As one example, the pressure chamber may include the first pressure chamber 112a located in front of the first hydraulic piston 113a (in a forward movement direction, that is, a leftward direction of the drawing), and the second pressure chamber 112b located in front of the second hydraulic piston 113b. Here, the first pressure chamber 112a may be a space comparted by means of a rear end of the first hydraulic piston 113a, a front end of the second hydraulic piston 113b, and an inner wall of the hydraulic pressure supply unit 110, and the second pressure chamber 112b may be a space comparted by means of a rear end of the second hydraulic piston 113b and the inner wall of the hydraulic pressure supply unit 110.

Also, a first hydraulic spring 114a may be provided between the first hydraulic piston 113a and the second hydraulic piston 113b, and a second hydraulic spring 114b may be provided between the second hydraulic piston 113b and an end of the cylinder block 111.

The first hydraulic spring 114a and the second hydraulic spring 114b are provided at the two pressure chambers 112a and 112b, respectively, and an elastic force is stored in the first hydraulic spring 114a and the second hydraulic spring 114b when the first hydraulic piston 113a and second hydraulic piston 113b are compressed. Further, when a force pushing the first hydraulic piston 113a is less than the elastic force, the first hydraulic spring 114a and the second hydraulic spring 114b may use the stored elastic force to push the first and second hydraulic pistons 113a and 113b and return the first and second hydraulic pistons 113a and 113b to their original positions, respectively.

The sealing member 115 may include a first sealing member 115a provided between the first hydraulic piston 113a and the cylinder block 111 to seal therebetween, and a second sealing member 115b provided between the second hydraulic piston 113b and the cylinder block 111 to seal therebetween.

The sealing member 115 seals the pressure chamber 112 to prevent hydraulic pressure or negative pressure from leaking therefrom. As one example, hydraulic pressure or negative pressure of the first pressure chamber 112a, which is generated while the first hydraulic piston 113a is moved forward or backward, may be blocked by the first and second sealing members 115a and 115b and may be delivered to a first hydraulic flow path 211 without leaking to the second pressure chamber 112b.

Referring back to FIG. 1, the first pressure chamber 112a is connected to the first hydraulic flow path 211 through a first communicating hole 111a formed at a rear side of the cylinder block 111 (in a backward movement direction, that is, a rightward direction of the drawing), and the second pressure chamber 112b is connected to a second hydraulic flow path 212 through a second communicating hole 111b formed at a front side of the cylinder block 111. The first hydraulic flow path 211 connects the hydraulic pressure supply unit 110 to the first hydraulic circuit 201, and the second hydraulic flow path 212 connects the hydraulic pressure supply unit 110 to the second hydraulic circuit 202.

The pressure chamber may be connected to the reservoir 30 through dump flow paths 116 and 117, and receive and store oil supplied from the reservoir 30 or deliver oil inside the pressure chamber to the reservoir 30. As one example, the dump flow paths may include a first dump flow path 116 branching from the first hydraulic flow path 211 and connected to the reservoir 30, and a second dump flow path 117 branching from the second hydraulic flow path 212 and connected to the reservoir 30.

Also, the electric brake system 1 according to the embodiment of the present disclosure may further include dump valves 231 and 232 which control opening and closing of the dump flow paths 116 and 117. The dump valves 231 and 232 may be configured with a check valve that is able to deliver hydraulic pressure in only one direction, and may allow hydraulic pressure to be delivered from the reservoir 30 to the first or second pressure chamber 112*a* or 112*b* and block hydraulic pressure from being delivered from the first or second pressure chamber 112*a* or 112*b* to the reservoir 30.

The dump valves include a first dump valve 231 installed at the first dump flow path 116 to control an oil flow, and a second dump valve 232 installed at the second dump flow path 117 to control an oil flow. The dump flow paths 116 and 117, at which the dump valves 231 and 232 are installed, may be connected to the hydraulic flow paths 211 and 212, and may be used when hydraulic pressure of the first or second pressure chamber 112*a* or 112*b* is supplemented.

Also, the hydraulic pressure supply unit 110 of the electric brake system 1 according to the embodiment of the present disclosure may be operated in a tandem manner. That is, hydraulic pressure, which is generated in the first pressure chamber 112*a* while the first hydraulic piston 113*a* is moved forward, may be delivered to the first hydraulic circuit 201 to activate the wheel cylinders 40 installed at the front left wheel FL and the front right wheel FR, and hydraulic pressure, which is generated in the second pressure chamber 112*b* while the second hydraulic piston 113*b* is moved forward, may be delivered to the second hydraulic circuit 202 to activate the wheel cylinders 40 installed at the rear right wheel RR and the rear left wheel RL.

The motor 120 is a device for generating a rotational force according to a signal output from the ECU (not shown) and may generate the rotational force in a forward or backward direction. An angular velocity and a rotational angle of the motor 120 may be precisely controlled. Because such a motor 120 is generally known in the art, a detailed description thereof will be omitted.

Meanwhile, the ECU controls not only the motor 120 but also the valves 54, 60, 221*a*, 221*b*, 221*c*, 221*d*, 222*a*, 222*b*, 222*c*, 222*d*, 241, 242, 250, 261, and 262 provided at the electric brake system 1 of the present disclosure, which will be described below. An operation of controlling a plurality of valves according to a displacement of the brake pedal 10 will be described below.

A driving force of the motor 120 generates a displacement of the first hydraulic piston 113*a* through the power conversion unit 130, and hydraulic pressure, which is generated while the first hydraulic piston 113*a* and the second hydraulic piston 113*b* slide inside the cylinder block 111, is delivered to the wheel cylinder 40 installed at each of the wheels RR, RL, FR, and FL through the first and second hydraulic flow paths 211 and 212.

The power conversion unit 130 is a device for converting a rotational force into a rectilinear movement, and, as one example, may be configured with a worm shaft 131, a worm wheel 132, and the drive shaft 133.

The worm shaft 131 may be integrally formed with a rotational shaft of the motor 120, and rotates the worm wheel 132 engaged therewith and coupled thereto through a worm that is formed on an outer circumferential surface of the worm shaft 131. The worm wheel 132 linearly moves the drive shaft 133 engaged therewith and coupled thereto, and the drive shaft 133 is connected to the first hydraulic piston 113*a* to slide the first hydraulic piston 113*a* inside the cylinder block 111.

To describe such operations again, a signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the first hydraulic piston 113*a* connected to the drive shaft 133 is moved forward to generate hydraulic pressure in the pressure chamber.

On the other hand, when the pedal effort is released from the brake pedal 10, the ECU activates the motor 120 in a reverse direction to reversely rotate the worm shaft 131. Consequently, the worm wheel 132 is also reversely rotated, and then the first hydraulic piston 113*a* connected to the drive shaft 133 is returned to its original position.

A signal, which is sensed by the pedal displacement sensor 11 when a displacement occurs at the brake pedal 10, is transmitted to the ECU (not shown), and then the ECU activates the motor 120 in one direction to rotate the worm shaft 131 in the one direction. A rotational force of the worm shaft 131 is transmitted to the drive shaft 133 via the worm wheel 132, and then the first hydraulic piston 113*a* connected to the drive shaft 133 is moved forward to generate hydraulic pressure in the first pressure chamber 112*a*. Further, the hydraulic pressure of the first pressure chamber 112*a* may move the second hydraulic piston 113*b* forward to generate hydraulic pressure in the second pressure chamber 112*b*.

On the other hand, when the pedal effort is released from the brake pedal 10, the ECU activates the motor 120 in a reverse direction, and thus the worm shaft 131 is reversely rotated. Consequently, the worm wheel 132 is also reversely rotated, and thus negative pressure is generated in the first pressure chamber 112*a* while the first hydraulic piston 113*a* connected to the drive shaft 133 is returned to its original position, that is, is moved backward. Further, the negative pressure in the first pressure chamber 112*a* and the elastic force of the first and second hydraulic springs 114*a* and 114*b* may move the second hydraulic piston 113*b* backward to generate negative pressure in the second pressure chamber 112*b*.

As described above, the hydraulic pressure supply device 100 serves to deliver the hydraulic pressure to the wheel cylinders 40 or to discharge and deliver the hydraulic pressure to the reservoir 30 according to a rotational direction of the rotational force generated from the motor 120.

Although not shown in the drawing, the power conversion unit 130 may be configured with a ball screw nut assembly. For example, the power conversion unit 130 may be configured with a screw which is integrally formed with the rotational shaft of the motor 120 or is connected to and rotated with the rotational shaft thereof, and a ball nut which is screw-coupled to the screw in a state in which a rotation of the ball nut is restricted to perform a rectilinear movement according to a rotation of the screw. The first hydraulic piston 113*a* is connected to the ball nut of the power conversion unit 130 to pressurize the pressure chamber by means of the rectilinear movement of the ball nut. Such a ball screw nut assembly is a device for converting a rotational movement into a rectilinear movement, and a structure thereof is generally known in the art so that a detailed description thereof will be omitted.

Also, it should be understood that the power conversion unit 130 according to the embodiment of the present disclosure may employ any structure capable of converting a rotational movement into a rectilinear movement in addition to the structure of the ball screw nut assembly.

Further, the electric brake system 1 according to the embodiment of the present disclosure may further include the first and second backup flow paths 251 and 252 capable of directly supplying oil discharged from the master cylinder 20 to the wheel cylinders 40 when the hydraulic pressure supply device 100 operates abnormally.

The first cut valve 261 for controlling an oil flow may be provided at the first backup flow path 251, and the second cut valve 262 for controlling an oil flow may be provided at the second backup flow path 252. Also, the first backup flow path 251 may connect the first hydraulic port 24a to the first hydraulic circuit 201, and the second backup flow path 252 may connect the second hydraulic port 24b to the second hydraulic circuit 202.

Further, the first and second cut valves 261 and 262 may be configured with a normally opened type solenoid valve that is usually opened and is closed when a closing signal is received from the ECU.

Next, the hydraulic control unit 200 according to the embodiment of the present disclosure will be described with reference to FIG. 1.

The hydraulic control unit 200 may be configured with the first hydraulic circuit 201 and the second hydraulic circuit 202, each of which receives hydraulic pressure to control two wheels. As one example, the first hydraulic circuit 201 may control the front right wheel FR and the rear left wheel RL, and the second hydraulic circuit 202 may control the front left wheel FL and the rear right wheel RR. Further, the wheel cylinder 40 is installed at each of the wheels FR, FL, RR, and RL to perform braking by receiving the hydraulic pressure.

The first hydraulic circuit 201 is connected to the first hydraulic flow path 211 to receive the hydraulic pressure provided from the hydraulic pressure supply device 100, and the first hydraulic flow path 211 branches into two flow paths that are connected to the front right wheel FR and the rear left wheel RL, respectively. Similarly, the second hydraulic circuit 202 is connected to the second hydraulic flow path 212 to receive the hydraulic pressure provided from the hydraulic pressure supply device 100, and the second hydraulic flow path 212 branches into two flow paths that are connected to the front left wheel FL and the rear right wheel RR, respectively.

The hydraulic circuits 201 and 202 may be provided with a plurality of inlet valves 221 (that is, 221a, 221b, 221c, and 221d) to control a hydraulic pressure flow. As one example, two inlet valves 221a and 221b may be provided at the first hydraulic circuit 201 and connected to the first hydraulic flow path 211 to independently control the hydraulic pressure delivered to two of the wheel cylinders 40. Also, two inlet valves 221c and 221d may be provided at the second hydraulic circuit 202 and connected to the second hydraulic flow path 212 to independently control the hydraulic pressure delivered to two of the wheel cylinders 40.

Further, the plurality of inlet valves 221 may be disposed at an upstream side of each of the wheel cylinders 40 and may be configured with a normally closed type solenoid valve that is usually closed and is opened when an opening signal is received from the ECU.

Also, the hydraulic control unit 200 may be further provided with a plurality of outlet valves 222 (that is, 222a, 222b, 222c, and 222d) connected to the reservoir 30 to improve brake release performance when the brake is released. Each of the outlet valves 222 is connected to the wheel cylinder 40 to control discharging of the hydraulic pressure from each of the wheels RR, RL, FR, and FL. That is, when brake pressure of each of the wheels RR, RL, FR, and FL is measured and a decompression of the brake is determined to be required, the outlet valves 222 may be selectively opened to control the brake pressure.

Further, the outlet valves 222 may be configured with a normally closed type solenoid valve that is usually closed and is opened when an opening signal is received from the ECU.

In addition, the hydraulic control unit 200 may be connected to the backup flow paths 251 and 252. As one example, the first hydraulic circuit 201 may be connected to the first backup flow path 251 to receive the hydraulic pressure provided from the master cylinder 20, and the second hydraulic circuit 202 may be connected to the second backup flow path 252 to receive the hydraulic pressure provided from the master cylinder 20.

At this point, the first backup flow path 251 may be connected to the first hydraulic circuit 201 at a downstream side of the first inlet valve 221a. Similarly, the second backup flow path 252 may be connected to the second hydraulic circuit 202 at a downstream side of the fourth inlet valve 221d. Consequently, when the first and second cut valves 261 and 262 are closed and the plurality of inlet valves 221a, 221b, 221c, and 221d are opened, the hydraulic pressure provided from the hydraulic pressure supply device 100 may be supplied to the wheel cylinders 40 through the first and second hydraulic flow paths 211 and 212. Also, when the first and second cut valves 261 and 262 are opened and the plurality of inlet valves 221a, 221b, 221c, and 221d are closed, the hydraulic pressure provided from the master cylinder 20 may be supplied to the wheel cylinders 40 through the first and second backup flow paths 251 and 252.

Moreover, the first hydraulic circuit 201 includes a first balance valve 241 connecting a branching flow path, which connects the first inlet valve 221a to the wheel cylinder 40 installed at the front right wheel FR, to a branching flow path, which connects the second inlet valve 221b to the wheel cylinder 40 installed at the rear left wheel RL. Additionally, the second hydraulic circuit 202 includes a second balance valve 242 connecting a branching flow path, which connects the third inlet valve 221c to the wheel cylinder 40 installed at the front left wheel FL, to a branching flow path, which connects the fourth inlet valve 221d to the wheel cylinder 40 installed at the rear right wheel RR.

The first balance valve 241 and the second balance valve 242 are provided at the flow paths connecting the first hydraulic circuit 201 to the second hydraulic circuit 202 and serve to connect or block the flow paths according to opening and closing operations.

Also, the first and second balance valves 241 and 242 may be configured with a normally opened type solenoid valve that is usually opened and is closed when a closing signal is received from the ECU.

The first balance valve 241 is operated to be opened when one of the first inlet valve 221a and the second inlet valve 221b is incorrectly operated so that the hydraulic pressure may be delivered to the front right wheel FR and the rear left wheel RL. Similarly, the second balance valve 242 is operated to be opened when one of the third inlet valve 221c and the fourth inlet valve 221d is incorrectly operated so that the hydraulic pressure may be delivered to front the left wheel FL and the rear right wheel RR.

As one example, because an initial position of the first balance valve 241 is in an open state in a braking mode even when the first inlet valve 221a is not in an open state, oil passing the third inlet valve 221c may be delivered to the wheel cylinder 40 of the front right wheel FR through the first balance valve 241. That is, even when the inlet valves 221 are incorrectly operated, the balance valves 241 and 242 may supply the hydraulic pressure to the four wheel cylinders 40 to assure stable braking.

Also, the hydraulic control unit 200 of the electric brake system 1 according to the embodiment of the present disclosure may include a circuit balance valve 250 that is installed to control opening and closing of a flow path for communicating the first pressure chamber 112a with the second pressure chamber 112b.

As one example, the circuit balance valve 250 may be installed at a flow path for communicating the first hydraulic flow path 211 and the second hydraulic flow path 212. At this point, the flow path at which the circuit balance valve 250 is installed may branch at an upstream of each of the inlet valves 221.

Referring to FIG. 1, the flow path at which the circuit balance valve 250 is installed may connect points, at which the first hydraulic flow path 211 and the second hydraulic flow path 212 branch into the two inlet valves 221a and 221b, and the two inlet valves 221c and 221d, respectively, to each other.

Further, the circuit balance valve 250 may be configured with a normally closed type solenoid valve that is usually closed and is opened when an opening signal is received from the ECU.

The circuit balance valve 250 may perform a balancing process to equilibrate the pressure chambers 112a and 112b in pressure inside the hydraulic pressure supply unit 110.

Generally, pressure of the first pressure chamber 112a and the second pressure chamber 112b balances. As one example, when an ABS in which a braking force is provided to only the front right wheel FR operates, only the hydraulic pressure of the first pressure chamber 112a of the two pressure chambers is delivered to the wheel cylinder 40. Even in such a case, a balance in pressure between the two pressure chambers may be maintained because the oil of the reservoir 30 is delivered to the first pressure chamber 112a through the dump valves 231.

However, when a leak occurs due to a repetitive operation of the hydraulic pressure supply device 100 or an ABS operation is abruptly performed, an imbalance in pressure between the first pressure chamber 112a and the second pressure chamber 112b may be caused. That is, the second hydraulic piston 113b may not be located at a calculated position to cause an incorrect operation.

The circuit balance valve 250 is switched to an open state in such a situation to connect the first hydraulic flow path 211 to the second hydraulic flow path 212, thereby communicating the first pressure chamber 112a and the second pressure chamber 112b with each other. Therefore, a balance in pressure between the first pressure chamber 112a and the second pressure chamber 112b is established. At this point, to rapidly proceed the balancing process, the motor 120 may be operated to push the first hydraulic piston 113a.

Also, even when one of the first hydraulic circuit 201 and the second hydraulic circuit 202 is incorrectly operated, the circuit balance valve 250 may deliver the hydraulic pressure to the four wheel cylinders 40 to assure stable braking.

When hydraulic pressure is not properly formed in the first pressure chamber 112a, or the first inlet valve 221a or the second inlet valve 221b is incorrectly operated, the hydraulic pressure provided from the first pressure chamber 112a may not be delivered to the wheel cylinder 40 provided at the front right wheel FR or the rear left wheel RL to cause an unstable braking situation.

At this point, the circuit balance valve 250 is switched to an open state to connect the first hydraulic circuit 201 to the second hydraulic circuit 202 so that the hydraulic pressure may be delivered to the four wheel cylinders 40 under the incorrect operation situation to assure stable braking.

Meanwhile, an undescribed reference number "PS11" is a first hydraulic flow path pressure sensor which senses hydraulic pressure of the first hydraulic circuit 201, an undescribed reference number "PS12" is a second hydraulic flow path pressure sensor which senses hydraulic pressure of the second hydraulic circuit 202, and an undescribed reference number "PS2" is a backup flow path pressure sensor which senses oil pressure of the master cylinder 20. Further, an undescribed reference number "MPS" is a motor control sensor which controls a rotational angle or a current of the motor 120.

Also, the electric brake system 1 according to the embodiment of the present disclosure may further include an inspection valve 60 that is installed at a flow path 31 connecting the master cylinder 20 to the reservoir 30. As described above, the flow path 31 connecting the master cylinder 20 to the reservoir 30 may be provided to correspond to the number of chambers inside the master cylinder 20.

Hereinafter, one example in which a plurality of flow paths 31, each of which connects the master cylinder 20 to the reservoir 30, are provided and the inspection valve 60 is installed at one of the plurality of flow paths 31 will be described. At this point, the remaining flow paths at which the inspection valve 60 is not installed may be blocked by controlling the valves including the second cut valve 262 and the like.

The flow path 31, which connects the reservoir 30 to a chamber provided between the first piston 21a and the second piston 22a of the master cylinder 20, may be configured with two flow paths connected in parallel with each other. A check valve 32 may be installed at one of the two flow paths connected in parallel with each other, and the inspection valve 60 may be installed at the other thereof.

The check valve 32 is provided to allow hydraulic pressure to be delivered from the reservoir 30 to the master cylinder 20, and to block the hydraulic pressure from being delivered from the master cylinder 20 to the reservoir 30. Further, the inspection valve 60 may be controlled to allow and block the hydraulic pressure that is delivered between the reservoir 30 and the master cylinder 20.

Consequently, when the inspection valve 60 is opened, the hydraulic pressure in the reservoir 30 may be delivered to the master cylinder 20 through the flow path at which the check valve 32 is installed and a flow path 61 at which the inspection valve 60 is installed, and the hydraulic pressure in the master cylinder 20 may be delivered to the reservoir 30 therethrough. Further, when the inspection valve 60 is closed, the hydraulic pressure in the reservoir 30 may be delivered to the master cylinder 20 through the flow path at which the check valve 32 is installed, but the hydraulic pressure in the master cylinder 20 is not delivered to the reservoir 30 through any flow path.

Meanwhile, the electric brake system 1 according to the embodiment of the present disclosure may be provided to usually allow the hydraulic pressure to be bidirectionally delivered between the reservoir 30 and the master cylinder 20, whereas, in an inspection mode, it may be provided to allow the hydraulic pressure to be delivered from the reservoir 30 to the master cylinder 20 but block the hydraulic pressure from being delivered from the master cylinder 20 to the reservoir 30.

Therefore, the inspection valve 60 may be configured with a normally opened type solenoid valve that is usually open and is closed when a closing signal is received.

As one example, the inspection valve 60 is maintained in an open state in a braking mode to allow the hydraulic pressure to be bidirectionally delivered between the reservoir 30 to the master cylinder 20. In addition, the inspection valve 60 may be maintained in a closed state in an inspection mode to prevent the hydraulic pressure in the master cylinder 20 from being delivered to the reservoir 30.

The inspection mode is a mode that inspects whether a loss of pressure exists by generating hydraulic pressure at the hydraulic pressure supply device 100 to inspect whether a leak occurs in the simulator valve 54. When the hydraulic pressure discharged from the hydraulic pressure supply device 100 is delivered to the reservoir 30 to cause the loss of pressure, it is difficult to identify whether a leak occurs in the simulator valve 54.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, the outlet valves 222, and the circuit balance valve 250 are closed and thus the flow paths connecting the hydraulic pressure supply device 100 to the reservoirs 30 are blocked so that the closed circuit may be configured.

In the inspection mode, the electric brake system 1 according to the embodiment of the present disclosure may provide the hydraulic pressure to only the first backup flow path 251, which is connected to the simulation device 50, of the first and second backup flow paths 251 and 252. Therefore, to prevent the hydraulic pressure discharged from the hydraulic pressure supply device 100 from being delivered to the master cylinder 20 through the second backup flow path 252, the third and fourth inlet valves 221c and 221d connected to the second hydraulic flow path 212 may be maintained in the closed state and the second cut valve 262 may be switched to a closed state.

In the inspection mode, whether a loss of the hydraulic pressure occurs may be determined through a measurement by means of the backup flow path pressure sensor PS2 after the hydraulic pressure is generated in the hydraulic pressure supply device 100. When the measurement result of the backup flow path pressure sensor PS2 indicates no occurrence of loss, a leak of the simulator valve 54 may be determined as not existing, and otherwise, when the measurement result thereof indicates the occurrence of loss, a leak may be determined as existing in the simulator valve 54.

Meanwhile, the inspection mode may be controlled to be executed when a vehicle is stopped or when it is determined that the driver has no intent to accelerate the vehicle.

At this point, when the hydraulic pressure discharged from the hydraulic pressure supply device 100 is provided to the wheel cylinders 40 in the inspection mode, a braking force not intended by the driver is generated. In this case, there is a problem in that acceleration intended by the driver is not realized due to the braking force which has been already provided even when the driver steps on an accelerator pedal (not shown). To prevent such a problem, the inspection mode may be controlled to be executed when a predetermined time passes after the vehicle has been stopped, in a state in which a hand brake is currently operated, or when the driver applies a predetermined braking force to the vehicle.

Also, when it is determined that the drive has an intent to accelerate the vehicle in a state of the inspection mode, the hydraulic pressure of the wheel cylinders 40 may be rapidly eliminated. That is, when the driver operates the accelerator pedal in the state of the inspection mode, the hydraulic pressure supply device 100 may be operated in reverse to an operation performed in the state of the inspection mode so that the hydraulic pressure of the wheel cylinders 40 may be rapidly eliminated. At this point, the outlet valves 222 may also be opened to assist in releasing the hydraulic pressure of the wheel cylinders 40 to the reservoirs 30.

Hereinafter, an operation of the electric brake system 1 according to the embodiment of the present disclosure will be described in detail.

When a driver begins braking, an amount of braking requested by the driver may be sensed through the pedal displacement sensor 11 on the basis of information including pressure applied to the brake pedal 10 by the driver or the like. The ECU (not shown) receives an electrical signal output from the pedal displacement sensor 11 to activate the motor 120.

Also, the ECU may receive an amount of regenerative braking through the backup flow path pressure sensor PS2 provided at the outlet side of the master cylinder 20 and the first and second hydraulic flow path pressure sensors PS11 and PS12 respectively provided at the first and second hydraulic circuits 201 and 202, and may calculate an amount of braking friction based on a difference between the amount of braking requested by the driver and the amount of regenerative braking, thereby determining the magnitude of an increase or reduction of pressure at the wheel cylinder 40.

When the driver steps on the brake pedal 10 at an initial stage of braking, the motor 120 is operated to rotate in one direction, a rotational force of the motor 120 is delivered to the hydraulic pressure supply unit 110 by means of the power conversion unit 130, and thus hydraulic pressure is generated in the first pressure chamber 112a and the second pressure chamber 112b while the first hydraulic piston 113a and the second hydraulic piston 113b of the hydraulic pressure supply unit 110 move forward. The hydraulic pressure discharged from the hydraulic pressure supply unit 110 is delivered to the wheel cylinder 40 installed at each of the four wheels through the first hydraulic circuit 201 and the second hydraulic circuit 202 to generate a braking force.

In particular, the hydraulic pressure provided from the first pressure chamber 112a is directly delivered to the wheel cylinder 40 provided at the front right wheel FR through the first hydraulic flow path 211 connected to the first communicating hole 111a. At this point, the first inlet valve 221a is switched to an open state. The first and second outlet valves 222a and 222b installed at flow paths respectively branching from two flow paths, which branch from the first hydraulic flow path 211, are maintained in the closed state to prevent the hydraulic pressure from leaking to the reservoirs 30.

Meanwhile, the third inlet valve 221c may be maintained in the closed state, and the first balance valve 241 may be maintained in the open state. Therefore, the hydraulic pressure passing the first inlet valve 221a may be delivered to the wheel cylinder 40 provided at the rear left wheel RL through the first balance valve 241 to generate a braking force.

Also, the hydraulic pressure provided from the second pressure chamber 112b is directly delivered to the wheel cylinder 40 provided at the rear right wheel RR through the second hydraulic flow path 212 connected to the second communicating hole 111b. At this point, the fourth inlet valve 221d is switched to an open state. The third and fourth outlet valves 222c and 222d installed at flow paths respectively branching from two flow paths, which branch from the second hydraulic flow path 212, are maintained in the closed state to prevent the hydraulic pressure from leaking to the reservoirs 30.

Meanwhile, the third inlet valve 221c may be maintained in the closed state, and the second balance valve 242 may be maintained in the open state. Therefore, the hydraulic pressure passing the fourth inlet valve 221*d* may also be delivered to the wheel cylinder 40 provided at the front left wheel FL through the second balance valve 242 to generate a braking force.

Also, when the hydraulic pressure is generated at the hydraulic pressure supply device 100, the first and second cut valves 261 and 262, which are installed at the first and second backup flow paths 251 and 252 connected to the first and second hydraulic ports 24*a* and 24*b* of the master cylinder 20, are closed so that the hydraulic pressure discharged from the master cylinder 20 is not delivered to the wheel cylinder 40.

In addition, the pressure generated by means of a pressurization of the master cylinder 20 according to the pedal effort of the brake pedal 10 is delivered to the simulation device 50 connected to the master cylinder 20. At this point, the normally closed type simulator valve 54 arranged at the rear end of the simulation chamber 51 is opened so that the oil filled in the simulation chamber 51 is delivered to the reservoir 30 through the simulator valve 54. Also, the reaction force piston 52 is moved, and pressure corresponding to a reaction force of the reaction force spring 53 supporting the reaction force piston 52 is generated inside the simulation chamber 51 to provide an appropriate pedal feeling to the driver.

Next, a case of releasing the braking force in a braking state established when the electric brake system 1 according to the embodiment of the present disclosure operates normally will be described.

When a pedal effort applied to the brake pedal 10 is released, the motor 120 generates a rotational force in a reverse direction compared to that of when the braking operation is performed to deliver the generated rotational force to the power conversion unit 130, and the worm shaft 131, the worm wheel 132, and the drive shaft 133 of the power conversion unit 130 are rotated in a reverse direction compared to that of when the braking operation is performed to move the first hydraulic piston 113*a* and the second hydraulic piston 113*b* backward and return the first hydraulic piston 113*a* and the second hydraulic piston 113*b* to their original positions, thereby releasing the pressure of the first pressure chamber 112*a* and the second pressure chamber 112*b*, or forming negative pressure therein. Further, the hydraulic pressure supply unit 110 receives the hydraulic pressure discharged from the wheel cylinder 40 through the first and second hydraulic circuits 201 and 202 to deliver the received hydraulic pressure to the first pressure chamber 112*a* and the second pressure chamber 112*b*.

In particular, the negative pressure formed in the first pressure chamber 112*a* is directly delivered to the wheel cylinder 40 provided at the front right wheel FR through the first hydraulic flow path 211 connected to the first communicating hole 111*a* to release the braking force. At this point, the first inlet valve 221*a* is switched to an open state. Also, the first and second outlet valves 222*a* and 222*b* installed at flow paths respectively branching from two flow paths, which branch from the first hydraulic flow path 211, are maintained in the closed state.

Meanwhile, the third inlet valve 221*c* may be maintained in the closed state, and the first balance valve 241 may be maintained in the open state. Therefore, the negative pressure delivered through the first inlet valve 221*a* may also be delivered to the wheel cylinder 40 provided at the rear left wheel RL through the first balance valve 241 to release the braking force.

Also, the negative pressure provided from the second pressure chamber 112*b* is directly delivered to the wheel cylinder 40 provided at the rear right wheel RR through the second hydraulic flow path 212 connected to the second communicating hole 111*b* to release the braking force. At this point, the fourth inlet valve 221*d* is switched to an open state. In addition, the third and fourth outlet valves 222*c* and 222*d* installed at flow paths respectively branching from two flow paths, which branch from the second hydraulic flow path 212, are maintained in the closed state.

Meanwhile, the third inlet valve 221*c* may be maintained in the closed state, and the second balance valve 242 may be maintained in the opened state. Therefore, the negative pressure delivered through the fourth inlet valve 221*d* may also be delivered to the wheel cylinder 40 provided at the front left wheel FL through the second balance valve 242 to release the braking force.

Also, when the negative pressure is generated at the hydraulic pressure supply device 100, the first and second cut valves 261 and 262, which are installed at the first and second backup flow paths 251 and 252 connected to the first and second hydraulic ports 24*a* and 24*b* of the master cylinder 20, are closed so that the negative pressure generated in the master cylinder 20 is not delivered to the wheel cylinder 40.

Meanwhile, in the simulation device 50, the oil in the simulation chamber 51 is delivered to the master cylinder 20 according to the return of the reaction force piston 52 to its original position by means of the elastic force of the reaction force spring 53, and the oil is refilled in the simulation chamber 51 through the simulator valve 54 and the simulator check valve 55 which are connected to the reservoir 30 to assure a rapid return of pressure of the pedal simulator.

Further, the electric brake system 1 according to the embodiment of the present disclosure may control the valves 221*a*, 221*b*, 221*c*, 221*d*, 222*a*, 222*b*, 222*c*, 222*d*, 241, 242, and 250 provided at the hydraulic control unit 200 according to pressure required for the wheel cylinder 40 provided at each of the wheels RR, RL, FR, and FL of the two hydraulic circuits 201 and 202, thereby specifying and controlling a control range.

Next, a state in which an ABS is operated through the electric brake system according to the embodiment of the present disclosure will be described.

When the motor 120 is operated according to a pedal effort of the brake pedal 10, a rotational force of the motor 120 is transmitted to the hydraulic pressure supply unit 110 through the power conversion unit 130, thereby generating hydraulic pressure. At this point, the first and second cut valves 261 and 262 are closed and thus the hydraulic pressure discharged from the master cylinder 20 is not delivered to the wheel cylinders 40.

Hydraulic pressure is generated in the first pressure chamber 112*a* and the second pressure chamber 112*b* while the first hydraulic piston 113*a* and the second hydraulic piston 113*b* are moved forward, the fourth inlet valve 221*d* is switched to an open state, and thus the hydraulic pressure delivered through the second hydraulic flow path 212 activates the wheel cylinder 40 located at the rear right wheel RR to generate a braking force.

At this point, the first to third inlet valves 221*a*, 221*b*, and 221*c* and the first to fourth outlet valves 222*a*, 222*b*, 222*c*, and 222*d* are maintained in the closed state. Further, the circuit balance valve 250 is maintained in the closed state to prevent the hydraulic pressure of the second hydraulic flow path 212 from being delivered to the first hydraulic flow path 211, and the second balance valve 242 is switched to a closed state so that the hydraulic pressure passing the fourth inlet valve 221*d* is not delivered to the front left wheel FL.

Next, a case in which the electric brake system 1 according to the embodiment of the present disclosure supplements hydraulic pressure will be described.

While the hydraulic pressure of the pressure chamber 112 is delivered to the wheel cylinders 40, the hydraulic pressure inevitably decreases. In such a circumstance, this may be dangerous in that a strong braking force as intended by a driver may not be delivered to the wheel cylinders 40 when a situation requiring the strong braking force occurs. Therefore, a supplement mode which maintains hydraulic pressure in the pressure chamber 112 at a predetermined level is needed.

A supplement mode is executed in a state in which a braking operation is not performed. As one example, when a braking operation is not performed for a predetermined time, the supplement mode may be executed.

In the supplement mode, the first to fourth inlet valves 221a, 221b, 221c, and 221d, the first to fourth outlet valves 222a, 222b, 222c, and 222d, and the first and second cut valves 261 and 262 are maintained in the closed state. In such a state, the motor 120 is reversely operated to return the first hydraulic piston 113a and the second hydraulic piston 113b to their original positions. As a result, negative pressure is formed in the first pressure chamber 112a and the second pressure chamber 112b and oil flows into the first pressure chamber 112a and the second pressure chamber 112b through the dump flow paths 116 and 117 such that hydraulic pressure is supplemented.

Next, a case in which such an electric brake system 1 operates abnormally will be described.

When the electric brake system 1 operates abnormally, each of the valves 54, 60, 221a, 221b, 221c, 221d, 222a, 222b, 222c, 222d, 241, 242, 250, 261, and 262 is provided in an initial state of braking, that is, a non-operating state. When a driver pressurizes the brake pedal 10, the input rod 12 connected to the brake pedal 10 is moved forward, and at the same time, the first piston 21a, which is in contact with the input rod 12, is moved forward and the second piston 22a is also moved forward by means of the pressurization or movement of the first piston 21a. At this point, because there is no gap between the input rod 12 and the first piston 21a, the braking may be rapidly performed.

Further, the hydraulic pressure discharged from the master cylinder 20 is delivered to the wheel cylinders 40 through the first and second backup flow paths 251 and 252 that are connected for the purpose of backup braking to realize a braking force.

At this point, the first and second cut valves 261 and 262 respectively installed at the first and second backup flow paths 251 and 252, and the first and second balance valves 241 and 242 provided at the downstream side of each of the inlet valves 221 and connecting the first hydraulic circuit 201 to the second hydraulic circuit 202 are configured with a normally opened type solenoid valve, and the simulator valve 54, the inlet valves 221, and the outlet valves 222 are configured with a normally closed type solenoid valve so that the hydraulic pressure is directly delivered to the four wheel cylinders 40. Therefore, braking is stably realized to improve braking safety.

Next, a state in which the electric brake system 1 according to the embodiment of the present disclosure operates in a dump mode will be described.

The electric brake system 1 according to the embodiment of the present disclosure may discharge braking pressure provided only to corresponding wheel cylinders 40 through the first to fourth outlet valves 222a, 222b, 222c, and 222d.

When the first to fourth inlet valves 221a, 221b, 221c, and 221d and the first to third outlet valves 222a, 222b, and 222c are maintained in the closed state, the second balance valve 242 is switched to the closed state, and the fourth outlet valve 222d is switched to the opened state, the hydraulic pressure discharged from the wheel cylinder 40 installed at the rear right wheel RR is discharged to the reservoir 30 through the fourth outlet valve 222d.

Meanwhile, although not shown in the drawing, the fourth outlet valve 222d may be opened to discharge the hydraulic pressure of the relevant wheel cylinder 40, at the same time, the first to third inlet valves 221a, 221b, and 221c may be opened, and the first balance valve 241 may be opened to supply the hydraulic pressure to the three remaining wheels FR, RL, and FL.

As described above, each of the valves 221a, 221b, 221c, 221d, 222a, 222b, 222c, 222d, 241, 242, and 250 of the hydraulic control unit 200 may be independently controlled to selectively deliver or discharge the hydraulic pressure to the wheel cylinder 40 of each of the wheels RL, RR, FL, and FR such that a precise control of the hydraulic pressure may be possible.

Next, a state in which the electric brake system 1 according to the embodiment of the present disclosure operates in a balance mode will be described.

The balance mode is performed when an imbalance in pressure between the first pressure chamber 112a and the second pressure chamber 112b occurs. As one example, the ECU may sense an imbalance state in pressure by analyzing signals transmitted from the first hydraulic flow path pressure sensor PS11 sensing the hydraulic pressure of the first hydraulic circuit 201 and the second hydraulic flow path pressure sensor PS12 sensing the hydraulic pressure of the second hydraulic circuit 202.

In the balance mode, the circuit balance valve 250 is switched to an open state. When the circuit balance valve 250 is opened so that the first hydraulic flow path 211 and the second hydraulic flow path 212 communicate with each other, a balance in pressure between the first pressure chamber 112a and the second pressure chamber 112b may be accomplished. However, to rapidly proceed the balancing process, the hydraulic pressure supply device 100 may be operated.

Hereinafter, an example when pressure in the second pressure chamber 112b is greater than that in the first pressure chamber 112a will be described. When the motor 120 is activated, the first hydraulic piston 113a and the second hydraulic piston 113b are moved forward, the hydraulic pressure of the second pressure chamber 112b is delivered from the second hydraulic flow path 212 to the first hydraulic flow path 211 through the circuit balance valve 250 that is in the open state, and, during such a process, a balance in pressure between the second pressure chamber 112b and the first pressure chamber 112a is accomplished.

When the pressure in the first pressure chamber 112a is greater than that in the second pressure chamber 112b, the hydraulic pressure of the first pressure chamber 112a is delivered to the second pressure chamber 112b to balance pressure.

Meanwhile, when the electric brake system 1 operates abnormally, each of the valves 54, 60, 221a, 221b, 221c, 221d, 222a, 222b, 222c, 222d, 241, 242, 250, 261, and 262 is provided in an initial state of braking, that is, a non-braking state, and the first and second cut valves 261 and 262 installed at the first and second backup flow paths 251 and 252 and the inlet valves 221 provided at the upstream of each of the wheels RR, RL, FR, and FL are opened so that the hydraulic pressure is directly provided to the wheel cylinders 40.

Also, the simulator valve 54 is provided in the closed state so that the hydraulic pressure delivered to the wheel cylinder 40 through the first backup flow path 251 is prevented from leaking to the reservoir 30 through the simulation device 50.

Therefore, the driver steps on the brake pedal 10 so that the hydraulic pressure discharged from the master cylinder 20 is delivered to the wheel cylinders 40 without a loss to assure stable braking.

However, when a leak occurs at the simulator valve 54, a portion of the hydraulic pressure discharged from the master cylinder 20 may be lost to the reservoir 30 through the simulator valve 54. The simulator valve 54 is provided to be closed in an abnormal mode, and the hydraulic pressure discharged from the master cylinder 20 pushes the reaction force piston 52 of the simulation device 50 so that a leak may occur at the simulator valve 54 by means of pressure formed at the rear end of the simulation chamber 51.

As such, when the leak occurs at the simulator valve 54, a braking force may not be obtained as intended by the driver. Consequently, there is a problem in safety of braking.

Next, a state in which the electric brake system 1 according to the embodiment of the present disclosure operates in an inspection mode will be described.

The inspection mode is a mode that inspects whether a loss of pressure exists by generating hydraulic pressure at the hydraulic pressure supply device 100 to inspect whether a leak occurs in the simulator valve 54. When the hydraulic pressure discharged from the hydraulic pressure supply device 100 is delivered to the reservoir 30 to cause a loss of pressure, it is difficult to identify whether a leak occurs at the simulator valve 54.

Therefore, in the inspection mode, the inspection valve 60 may be closed and thus a hydraulic circuit connected to the hydraulic pressure supply device 100 may be configured as a closed circuit. That is, the inspection valve 60, the simulator valve 54, and the outlet valves 222 are closed and thus the flow paths connecting the hydraulic pressure supply device 100 to the reservoirs 30 are closed so that the closed circuit may be configured.

In the inspection mode, the electric brake system 1 according to one embodiment of the present disclosure may provide the hydraulic pressure to only the first backup flow path 251, which is connected to the simulation device 50, of the first and second backup flow paths 251 and 252. Therefore, to prevent the hydraulic pressure discharged from the hydraulic pressure supply device 100 from being delivered to the master cylinder 20 through the second backup flow path 252, the second cut valve 262 and the circuit balance valve 250 may be maintained in the closed state in the inspection mode.

In the inspection mode, at the initial state of the valves 54, 60, 221a, 221b, 221c, 221d, 222a, 222b, 222c, 222d, 241, 242, 250, 261, and 262 provided at the electric brake system 1 of the present disclosure, the first inlet valve 221a or the second inlet valve 221b and the first cut valve 261 may be switched to an open state so that the hydraulic pressure generated at the hydraulic pressure supply device 100 may be transmitted to the master cylinder 20. At this point, when the first inlet valve 221a is opened, the third inlet valve 221c and the first balance valve 241 are closed, and, when the second inlet valve 221b is opened, the first balance valve 241 is closed.

In the inspection mode, after generating the hydraulic pressure at the hydraulic pressure supply device 100, the ECU may analyze a signal transmitted from the backup flow path pressure sensor PS2 measuring oil pressure of the master cylinder 20 to sense whether a leak occurs at the simulator valve 54.

When there is no loss on the basis of the measurement result of the backup flow path pressure sensor PS2, the simulator valve 54 may be determined to have no leak, and when the loss occurs, the simulator valve 54 may be determined to have a leak.

Next, a diagnosis mode of the electric brake system according to the embodiment of the present disclosure will be described.

The diagnosis mode is a mode for detecting abnormality of a hydraulic circuit or valves and providing detection information to the driver. The driver recognizes the abnormality of the hydraulic circuit or the valves in advance to prevent an accident. An abnormality signal may be provided to the driver using a screen, sound, light, or the like. Hereinafter, only a process of diagnosing whether abnormality occurs will be described.

In the diagnosis mode, an ECU transmits a signal to a hydraulic pressure supply device to generate hydraulic pressure when a driver does not step on a brake pedal. Further, a controller used in the diagnosis mode receives information related to a magnitude of hydraulic pressure, which is provided to the hydraulic circuit, through a pressure sensor and inspects the received information to diagnose abnormality.

The diagnosis mode may be executed when attention of the driver is not sensitive. The reason for that is that noise and vibration may be somewhat generated because the hydraulic pressure supply device and various kinds of valves are operated in the diagnosis mode. However, the diagnosis mode is executed when attention of the driver is not sensitive to prevent the driver from feeling a displeasure feeling due to noise or vibration generated in the diagnosis mode. For example, the diagnosis mode may be executed when the driver turns on or off starting of a vehicle. As one example, the diagnosis mode may be executed when the driver operates an ignition key (IGN ON or OFF).

Also, the diagnosis mode may be executed while a vehicle is stopped. While the diagnosis mode is executed, hydraulic pressure may be provided to a wheel cylinder and thus a braking force may be generated regardless of intent of the driver. Therefore, to prevent a braking force from being unintentionally generated and to improve driving stability, it may be preferable that the diagnosis mode is executed while the vehicle is stopped.

In addition, the diagnosis mode may be executed when a displacement of the brake pedal does not occur. While the diagnosis mode is executed, a predetermined hydraulic pressure is not provided to the wheel cylinder. Therefore, if the diagnosis mode is executed when the driver steps on the brake pedal and thus the vehicle is stopped on an inclined road, the vehicle may be unintentionally moved to cause a dangerous situation. To prevent such a situation, the diagnosis mode may be executed when a displacement of the brake pedal does not occur.

Further, the diagnosis mode may be executed in a state in which a gear is in a parking mode P. When a gear is in a neutral mode N or a driving mode D, the driver may abruptly operate an accelerator or the brake pedal. When the diagnosis mode is executed in a state in which the gear is in the neutral mode N or the driving mode D, an unintentional situation may be developed while the driver abruptly performs an operation for driving or braking. However, when the diagnosis mode is executed in a state in which the gear is in the parking mode P, a certain time is required because the driver should change the gear from the parking mode P to the neutral mode N or the driving mode D in order to perform an operation for driving or braking. Therefore, the diagnosis mode may be completed for the certain time so that such a problem described above may be prevented.

In the diagnosis mode, the hydraulic pressure supply device operates, and, as one example, a hydraulic piston of a hydraulic pressure supply unit is moved by means of an operation of a motor to generate pressure. At this point, pressure being generated may be selected in a range that does not affect durability of a brake system. As one example, pressure may be selected in a range not exceeding 35 bar, and preferably, within a range of 25 bar.

Also, it is necessary to initialize the hydraulic pressure supply unit before the diagnosis mode is executed. As one example, correction or calibration may be performed on the motor of the hydraulic pressure supply unit to locate the hydraulic piston at an initial position.

The diagnosis mode according to the embodiment of the present disclosure may be provided with 5 steps. That is, a first diagnosis state to a fifth diagnosis state may be included. Of course, the steps of the diagnosis mode may be subdivided and some steps thereof may be omitted.

FIG. 3 is a hydraulic circuit diagram illustrating a state in which a first diagnosis state is operated.

Referring to FIG. 3, in the first diagnosis state, first to fourth inlet valves are switched to an open state and first to fourth outlet valves are maintained in a closed state. At this point, a first balance valve and a second balance valve may be maintained in an open state or may be switched to a closed state. Also, a circuit balance valve may be maintained in a closed state or may be switched to an open state. Further, a first cut valve and a second cut valve may be switched to a closed state.

In such a state, when the hydraulic pressure supply device operates to supply hydraulic pressure to a first hydraulic circuit and a second hydraulic circuit, the first cut valve and the second cut valve are in the closed state so that the hydraulic pressure generated in the hydraulic pressure supply device is not supplied to a master cylinder and a simulation device and thus it is remained in the first hydraulic circuit and the second hydraulic circuit of a hydraulic control unit.

In the first diagnosis state, the hydraulic pressure inside the hydraulic circuits may be inspected using a first hydraulic flow path pressure sensor and a second hydraulic flow path pressure sensor. At this point, when the pressure sensed through the pressure sensors is greater or less than a first reference pressure, it may be determined that a problem occurs at the brake system.

FIG. 4 is a graph illustrating a pressure distribution in the first diagnosis state.

Referring to FIG. 4, in the first diagnosis state, hydraulic pressure is generated up to the first reference pressure for a time t1. At this time, the first reference pressure may be 5 bar.

When the pressure sensed through the pressure sensors is greater than the first reference pressure, one or more of the first to fourth inlet valves which should be opened may be diagnosed to be abnormal. Otherwise, when the pressure sensed through the pressure sensors is less than the first reference pressure, it may be diagnosed that one or more among the first to fourth outlet valves, the first and second cut valves and first and second dump valves which should be closed are to be abnormal so that the hydraulic pressure leaks. Also, a first sealing member of the hydraulic pressure supply unit may cause a leak.

FIG. 5 is a hydraulic circuit diagram illustrating a state in which a second diagnosis state is operated.

Referring to FIG. 5, in the second diagnosis state, only one of the first to fourth inlet valves may be maintained in an open state and the remaining three inlet valves may be switched to a closed state. Further, the first to fourth outlet valves may be maintained in the closed state. At this point, it is preferable that the first balance valve and the second balance valve are in a closed state.

Further, the first cut valve and the second cut valve may be switched to an open state. Therefore, the first hydraulic circuit and a first backup flow path communicate with each other, and consequently, the hydraulic control unit and the master cylinder are connected to each other. At this point, an inspection valve is switched to a closed state so that the hydraulic pressure of the master cylinder does not leak to a reservoir, and a simulator valve is also maintained in the closed state so that the hydraulic pressure provided to the master cylinder through the first backup flow path does not leak to the simulation device.

Hereinafter, a case in which the second to fourth inlet valves are switched to a closed state to open only the first inlet valve will be described as an example.

When the hydraulic pressure supply device operates, the hydraulic pressure is delivered to the first hydraulic circuit. At this point, because the third inlet valve, the fourth inlet valve, and the circuit balance valve are in the closed state, the hydraulic pressure is not delivered to the second hydraulic circuit. Also, because the first balance valve is in the closed state, the hydraulic pressure generated while a first hydraulic piston is moved forward may be delivered to only a wheel cylinder provided at a front right wheel FR and the first backup flow path through the first inlet valve.

The hydraulic pressure, which is delivered to the first backup flow path through the first cut valve being opened, pushes a second hydraulic piston of the master cylinder to be delivered to a second backup flow path through a second hydraulic port. Further, the hydraulic pressure of the second backup flow path may be delivered to the second hydraulic circuit through the second cut valve being opened, and specifically, may be delivered to a wheel cylinder provided at a rear right wheel RR. At this point, the fourth inlet valve, the fourth outlet valve, and the second balance valve are in the closed state.

In the second diagnosis state, the hydraulic pressure in the hydraulic circuits may be inspected using the first hydraulic flow path pressure sensor, the second hydraulic flow path pressure sensor, or a backup flow path pressure sensor. At this point, when the pressure sensed through the pressure sensors is greater or less than a second reference pressure, it may be determined that a problem occurs at the brake system.

FIG. 6 is a graph illustrating a pressure distribution in the second diagnosis state.

Referring to FIG. 6, in the second diagnosis state, the hydraulic pressure is generated up to the second reference pressure for a time (t2–t1). At this point, the second reference pressure may be provided to be greater than the first reference pressure, and, as one example, the second reference pressure may be 10 bar.

When the pressure sensed through the pressure sensors is greater than the second reference pressure, one or more of the first inlet valve, the first cut valve, and the second cut valve which should be opened may be diagnosed to be abnormal. Otherwise, when the pressure sensed through the pressure sensors is less than the second reference pressure, it may be diagnosed that one or more among the first to fourth outlet valves, the simulator valve, the first and second dump valves, a simulator check valve, and a check valve installed in parallel with the inspection valve are to be abnormal so that the hydraulic pressure leaks. Also, the first sealing member of the hydraulic pressure supply unit or a sealing member of the master cylinder may cause a leak.

FIG. 7 is a hydraulic circuit diagram illustrating a state in which a third diagnosis state is operated.

Referring to FIG. 7, in the third diagnosis state, the first balance valve and the second balance valve are switched to an open state. Therefore, the hydraulic pressure delivered through the first inlet valve may be delivered to a wheel cylinder provided at a rear left wheel RL through the first balance valve, and the hydraulic pressure delivered to the second cut valve may be delivered to a wheel cylinder provided at a front left wheel FL through the second balance valve.

In the third diagnosis state, the hydraulic pressure in the hydraulic circuits may be inspected using the first hydraulic flow path pressure sensor, the second hydraulic flow path pressure sensor, or the backup flow path pressure sensor. At this point, when the pressure sensed through the pressure sensors is greater or less than a third reference pressure, it may be determined that a problem occurs at the brake system.

FIG. 8 is a graph illustrating a pressure distribution in the third diagnosis state.

Referring to FIG. 8, in the third diagnosis state, the hydraulic pressure is reduced up to the third reference pressure for a time (t3–t2). At this point, the third reference pressure may be provided to be less than the second reference pressure.

When the pressure sensed through the pressure sensors is greater than the third reference pressure, one or more of the first and second balance valves which should be opened may be diagnosed to be abnormal.

FIG. 9 is a hydraulic circuit diagram illustrating a state in which a fourth diagnosis state is operated.

Referring to FIG. 9, in the fourth diagnosis state, the simulator valve may be switched to an open state. Therefore, the hydraulic pressure delivered through the first cut valve may be delivered to the reservoir through the simulator valve.

In the fourth diagnosis state, the hydraulic pressure in the hydraulic circuits may be inspected using the first hydraulic flow path pressure sensor, the second hydraulic flow path pressure sensor, or the backup flow path pressure sensor. At this point, when the pressure sensed through the pressure sensors is greater or less than a fourth reference pressure, it may be determined that a problem occurs at the brake system.

FIG. 10 is a graph illustrating a pressure distribution in the fourth diagnosis state.

Referring to FIG. 10, in the fourth diagnosis state, the hydraulic pressure is reduced up to the fourth reference pressure for a time (t4–t3). At this point, the fourth reference pressure may be provided to be less than the third reference pressure.

When the pressure sensed through the pressure sensors is greater than the fourth reference pressure, the simulator valve which should be opened may be diagnosed to be abnormal.

FIG. 11 is a hydraulic circuit diagram illustrating a state in which a fifth diagnosis state is operated.

Referring to FIG. 11, in the fifth diagnosis state, the first to fourth outlet valves may be switched to an open state. Therefore, the hydraulic pressure delivered to the wheel cylinders may be delivered to the reservoirs through the first to fourth outlet valve.

In the fifth diagnosis state, the hydraulic pressure in the hydraulic circuits may be inspected using the first hydraulic flow path pressure sensor, the second hydraulic flow path pressure sensor, or the backup flow path pressure sensor. At this point, when the pressure sensed through the pressure sensors is greater or less than a fifth reference pressure, it may be determined that a problem occurs at the brake system.

FIG. 12 is a graph illustrating a pressure distribution in the fifth diagnosis state.

Referring to FIG. 12, in the fifth diagnosis state, the hydraulic pressure is reduced up to an initial state for a time (t5–t4). At this point, the hydraulic pressure in the initial state is the same as the hydraulic pressure before the inspection mode is executed.

When the pressure sensed through the pressure sensors is greater than the fifth reference pressure, one or more of the first to fourth outlet valves which should be opened may be diagnosed to be abnormal.

As is apparent from the above description, the electric brake system according to the embodiments of the present disclosure is capable of preventing an accident in advance by including a diagnosis mode and detecting abnormality of mechanical components in advance to inform a driver of the detection result.

Also, a diagnosis mode is executed when a driver does not recognize the execution of the diagnosis mode so that it may prevent a different operation feeling from being provided.

| [Description of Reference Numerals] | |
|---|---|
| 10: Brake Pedal | 11: Pedal Displacement Sensor |
| 20: Master Cylinder | 30: Reservoir |
| 40: Wheel Cylinder | 50: Simulation Device |
| 54: Simulator Valve | 60: Inspection Valve |
| 100: Hydraulic Pressure Supply Device | 110: Hydraulic Pressure Supply Unit |
| 120: Motor | 130: Power Conversion Unit |
| 200: Hydraulic Control Unit | 201: First Hydraulic Circuit |
| 202: Second Hydraulic Circuit | 211: First Hydraulic Flow Path |
| 212: Second Hydraulic Flow Path | 221: Inlet Valve |
| 222: Outlet Valve | 231: First Dump Valve |
| 232: Second Dump Valve | 241: First Balance Valve |
| 242: Second Balance Valve | 250: Circuit Balance Valve |
| 251: First Backup Flow Path | 252: Second Backup Flow Path |
| 261: First Cut Valve | 262: Second Cut Valve |

What is claimed is:

1. A method for diagnosing an electric brake system, which includes a reservoir configured to store oil, a master cylinder at which first and second hydraulic ports are formed, connected to the reservoir, and having one or more pistons to discharge oil according to a pedal effort of a brake pedal, a first backup flow path configured to connect the first hydraulic port to a wheel cylinder, a second backup flow path configured to connect to the second hydraulic port to a wheel cylinder, a first cut valve provided at the first backup flow path and configured to control an oil flow, a second cut valve provided at the second backup flow path and configured to control an oil flow, a simulation device provided at a flow path branching from the first backup flow path, provided with a simulator valve provided at a flow path connecting a simulation chamber in which oil is accommodated to the reservoir, and configured to provide a reaction force according to the pedal effort of the brake pedal, a hydraulic pressure supply device configured to operate in response to an electrical signal output from a pedal displacement sensor sensing a displacement of the brake pedal and generate hydraulic pressure by means of an operation of a hydraulic piston, a first hydraulic flow path connected to the hydraulic pressure supply device and to the first backup flow path, a second hydraulic flow path connected to the hydraulic pressure supply device and to the second backup flow path, a hydraulic control unit connected to the first and second hydraulic flow paths, configured to deliver the hydraulic pressure discharged from the hydraulic pressure supply device to a wheel cylinder provided at each of wheels, and including first and second hydraulic circuits connected to different wheel cylinders, a first inlet valve, a second inlet valve, a third inlet valve, and a fourth inlet valves provided at an upstream side of the wheel cylinder to control hydraulic pressure flowing to the wheel cylinder installed at each of the wheels, first to fourth outlet valves configured to control opening and blocking of a flow path branching from a flow path between the first to fourth inlet valves and the wheel cylinder to be connected to the reservoir, and an electronic control unit configured to control the hydraulic pressure supply device and a plurality of valves on the basis of hydraulic pressure information and displacement information of the brake pedal, comprising a first diagnosis mode of:

closing the first cut valve and the second cut valve when the pedal effort is not provided to the brake pedal;

operating the hydraulic pressure supply device to generate hydraulic pressure at the hydraulic control unit;

measuring the hydraulic pressure in the first or second hydraulic circuit; and comparing the measured hydraulic pressure with a first reference pressure to diagnose abnormality of the first and second cut valves, the first to fourth inlet valves, and the first to fourth outlet valves, wherein the method further includes a second diagnosis mode of:

opening the first cut valve and the second cut valve when the pedal effort is not provided to the brake pedal.

2. The method of claim 1, wherein the second diagnosis mode further includes:

opening some of the first to fourth inlet valves;

closing the first to fourth outlet valves;

operating the hydraulic pressure supply device to generate hydraulic pressure at the hydraulic control unit;

measuring hydraulic pressure at one or more of the first and second hydraulic circuits and the first and second backup flow paths; and comparing the measured hydraulic pressure with a second reference pressure to diagnose abnormality of the first and second cut valves, the first to fourth inlet valves, the first to fourth outlet valves, and the simulator valve.

3. The method of claim 2, wherein the electric brake system further includes an inspection valve provided at a flow path connecting the reservoir to the master cylinder, and the second diagnosis mode generates hydraulic pressure at the hydraulic control unit when the inspection valve is closed.

4. The method of claim 2, wherein the hydraulic pressure supply device of the electric brake system includes a cylinder block, first and second hydraulic pistons movably accommodated inside the cylinder block, and first and second pressure chambers comparted by the first and second hydraulic pistons, the hydraulic control unit includes:

a first hydraulic circuit configured to communicate with the first pressure chamber and connected to a first wheel cylinder through the first inlet valve;

a second hydraulic circuit configured to communicate with the first pressure chamber and connected to a second wheel cylinder through the second inlet valve;

a third hydraulic circuit configured to communicate with the second pressure chamber and connected to a third wheel cylinder through the third inlet valve; and a fourth hydraulic circuit configured to communicate with the second pressure chamber and connected to a fourth wheel cylinder through the fourth inlet valve, and the second diagnosis mode generates hydraulic pressure at the hydraulic control unit when only the first inlet valve is opened and the second to fourth inlet valves are closed.

5. The method of claim 4, wherein the hydraulic control unit of the electric brake system further includes:

a first balance valve installed at a downstream side of each of the first inlet valve and the third inlet valve and configured to open and block a flow path provided to communicate the first hydraulic circuit to the third hydraulic circuit; and a second balance valve installed at a downstream side of each of the second inlet valve and the fourth inlet valve and configured to open and block a flow path provided to communicate the second hydraulic circuit to the fourth hydraulic circuit, and the second diagnosis mode generates hydraulic pressure at the hydraulic control unit when the first and second balance valves are closed.

6. The method of claim 5, further comprising a third diagnosis mode of:

opening the first cut valve and the second cut valve when the pedal effort is not provided to the brake pedal;

opening some of the first to fourth inlet valves;

closing the first to fourth outlet valves;

opening the first and second balance valves;

operating the hydraulic pressure supply device to generate hydraulic pressure at the hydraulic control unit;

measuring hydraulic pressure at one or more among the first and second hydraulic circuits and the first and second backup flow paths; and comparing the measured hydraulic pressure with a third reference pressure to diagnose abnormality the first and second balance valves.

7. The method of claim 6, wherein the second diagnosis mode and the third diagnosis mode are compared with each other to diagnose abnormality of the first or second balance valve.

8. The method of claim 6, further comprising a fourth diagnosis mode of:

opening the first cut valve and the second cut valve when the pedal effort is not provided to the brake pedal;

opening some of the first to fourth inlet valves;

closing the first to fourth outlet valves;

opening the simulator valve;

operating the hydraulic pressure supply device to generate hydraulic pressure at the hydraulic control unit;

measuring hydraulic pressure at one or more among the first and second hydraulic circuits and the first and second backup flow paths; and comparing the measured hydraulic pressure with a fourth reference pressure to diagnose abnormality of the simulator valve.

9. The method of claim 6, further comprising a fourth diagnosis mode of:
  opening the simulator valve to measure the hydraulic pressure again after the third diagnosis mode is executed; and
  comparing the measured hydraulic pressure with a fourth reference pressure to diagnose abnormality of the simulator valve.

10. The method of claim 9, wherein the third diagnosis mode and the fourth diagnosis mode are compared with each other to diagnose abnormality of the simulator valve.

11. The method of claim 8, further comprising a fifth diagnosis mode of:
  opening the first cut valve and the second cut valve when the pedal effort is not provided to the brake pedal;
  opening some of the first to fourth inlet valves;
  opening the first to fourth outlet valves;
  opening the first and second balance valves;
  operating the hydraulic pressure supply device to generate hydraulic pressure at the hydraulic control unit;
  measuring hydraulic pressure at one or more among the first and second hydraulic circuits and the first and second backup flow paths; and
  comparing the measured hydraulic pressure with a fifth reference pressure to diagnose abnormality of the first to fourth outlet valves.

12. The method of claim 8, further comprising a fifth diagnosis mode of:
  opening the first to fourth outlet valves to measure the hydraulic pressure again after the third diagnosis mode is executed; and
  comparing the measured hydraulic pressure with a fifth reference pressure to diagnose abnormality of the first to fourth outlet valves.

13. The method of claim 12, wherein the fourth diagnosis mode and the fifth diagnosis mode are compared with each other to diagnose abnormality of the first to fourth outlet valves.

14. The method of claim 1, wherein the execution of the first diagnosis mode is completed while a vehicle is in a stop state and the pedal effort is not provided to the brake pedal.

15. The method of claim 14, wherein the first diagnosis mode is executed when a gear of the vehicle is in a parking mode.

* * * * *